United States Patent
Takeda et al.

(10) Patent No.: US 7,941,563 B2
(45) Date of Patent: *May 10, 2011

(54) ADDRESS TRANSLATION EQUIPMENT, TERMINAL EQUIPMENT AND MOBILE COMMUNICATION METHOD

(75) Inventors: Yukiko Takeda, Tokorozawa (JP); Takehiro Morishige, Hachioji (JP); Hidenori Inouchi, Higashimurayama (JP); Koji Tanaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 652 days.

This patent is subject to a terminal disclaimer.

(21) Appl. No.: 12/003,824

(22) Filed: Jan. 2, 2008

(65) Prior Publication Data

US 2008/0114898 A1      May 15, 2008

Related U.S. Application Data

(63) Continuation of application No. 10/330,306, filed on Dec. 30, 2002, now Pat. No. 7,328,281.

(30) Foreign Application Priority Data

May 30, 2002 (JP) .................................. 2002-156642

(51) Int. Cl.
*G06F 15/16* (2006.01)
*G06F 15/173* (2006.01)
(52) U.S. Cl. ........................ 709/246; 709/238; 709/249
(58) Field of Classification Search .................. 709/246, 709/249, 238
See application file for complete search history.

(56) References Cited

U.S. PATENT DOCUMENTS

| | | | |
|---|---|---|---|
| 6,118,784 A | 9/2000 | Tsuchiya et al. | |
| 6,816,912 B1 | 11/2004 | Borella et al. | |
| 6,862,274 B1 | 3/2005 | Tsao et al. | |
| 7,123,626 B1 | 10/2006 | Feyerabend | |
| 2002/0169887 A1 | 11/2002 | MeLampy et al. | |
| 2003/0050051 A1 | 3/2003 | Vilander | |
| 2003/0110292 A1 | 6/2003 | Takeda et al. | |
| 2004/0093434 A1 | 5/2004 | Hovell et al. | |
| 2004/0137888 A1 | 7/2004 | Ohki | |

OTHER PUBLICATIONS

Flykt, P. et al. "SIP services and interworking with IPv6", 3G Mobile Communication Technologies, Conference Publication No. 477, Mar. 2001, pp. 186-190.
U.S. Appl. No. 10/081,535, filed Feb. 25, 2002, Takeda et al.
U.S. Appl. No. 10/061,331, filed Feb. 4, 2002, Inouchi et al.

*Primary Examiner* — Kenny S Lin
(74) *Attorney, Agent, or Firm* — Stites & Harbison, PLLC; Jaun Carlos A. Marquez, Esq

(57) ABSTRACT

A packet sent in a mobile IP communication between different regions passes through a particular address translation unit, so that the communication route cannot be optimized. The packet cannot be delivered to a mobile node not having a fixed home address. To overcome the difficulties, the address translation unit includes a function to process the mobile IPv6 protocol. The mobile node includes a function to dynamically acquire a home address. A first network and a second network each identify the mobile node by a SIP (session initiation protocol) identifier. The mobile node acquires a home address on the second network and registers a corresponding relation between the identifiers and the home address thereof. A terminal on the second network acquires the home address of the mobile node from information of the mobile node registered to the SIP server according to a SIP procedure.

4 Claims, 31 Drawing Sheets

FIG.9

401 SIP REGISTER MESSAGE EXAMPLE 1 (MN3→SIP SERVER 5b)

start-line: REGISTER sip : visit.com SIP/2.0 message-header:
- Via : SIP/2.0/UDP visit.com
- From : sip : .userA%home.com@visit.com
- To : sip : userA%home.com@visit.com
- Call-ID : 12345600@visit.com
- CSeq : 1 REGISTER
- Contact : sip : userA@mn6
- Expires : 7200

FIG.10

402 SIP REGISTER MESSAGE EXAMPLE 2 (MN3→SIP SERVER 5a)

start-line: REGISTER sip : home.com SIP/2.0 message-header:
- Via : SIP/2.0/UDP visit.com
- From : sip : .userA@home.com
- To : sip : userA@home.com
- Call-ID : 12345600@visit.com
- CSeq : 1 REGISTER
- Contact : sip : userA%home.com@visit.com
- Expires : 7200

FIG.11

420 ROUTER ADVERTISEMENT MESSAGE FORMAT

| | | | | | | |
|---|---|---|---|---|---|---|
| IPv6 ICMP 421 | TYPE (134) | CODE (0) | | CHECKSUM | | |
| | CUR HOP LIMIT | M O H | RESERVED | ROUTER LIFETIME | | |
| | REACHABLE TIME | | | | | |
| | RETRANS TIMER | | | | | |
| PREFIX INFORMATION OPTION 422 | TYPE (3) | LENGTH (4) | PREFIX LENGTH | L A R | RESERVED 1 | |
| | VALID LIFETIME | | | | | |
| | PREFERRED LIFETIME | | | | | |
| | RESERVED 2 | | | | | |
| | PREFIX | | | | | |
| SOURCE LINK-LAYER ADDRESS OPTION 423 | TYPE (1) | LENGTH (1) | LINK-LAYER ADDRESS | | | |
| | LINK-LAYER ADDRESS | | | | | |
| ADVERTISEMENT INTERVAL OPTION 424 | TYPE (7) | LENGTH (1) | RESERVED | | | |
| | ADVERTISEMENT INTERVAL | | | | | |
| HOME AGENT INFORMATION OPTION 425 | TYPE (8) | LENGTH (1) | RESERVED | | | |
| | HOME AGENT PREFERENCE | | HOME AGENT LIFETIME | | | |

440 BINDING ACKNOWLEDGEMENT MESSAGE FORMAT

| PAYLOAD PROTO | HEADER LENGTH | MH TYPE 6(BINDING ACKNOWLEDGEMENT) |
|---|---|---|
| CHECKSUM | | RESERVED |
| STATUS | RESERVED | SEQUENCE NUMBER |
| LIFETIME | | |
| REFRESH | | |
| PARAMETER | | |

IPV6 MOBILITY HEADER 441

600 ADDRESS QUERY REQUEST

FIG.16

500 TRANSLATION INFORMATION TABLE

| V4 ADDRESS (501) | V6 ADDRESS (502) | |
|---|---|---|
| vmn4 | mn6 | 500-1 |
| vsipa4 | sipa6 | 500-2 |
| a4 | va6 | 500-3 |
| sipb4 | vsipb6 | 500-4 |
| ⋮ | | 500-n |

FIG.17

510 SIP INFORMATION MANAGEMENT TABLE (NETWORK 7a)

| SIP-URI (511) | LOCATION INFORMATION (512) | |
|---|---|---|
| userA@home.com | userA%home.com@visit.com | 510-1 |
| | | 510-2 |
| ⋮ | | 510-n |

FIG.18

520 SIP INFORMATION MANAGEMENT TABLE (NETWORK 7b)

| SIP-URI (521) | LOCATION INFORMATION (522) | |
|---|---|---|
| userA%home.com@visit.com | userA@mn6 | ~520-1 |
| | | ~520-2 |
| ⋮ | | ~520-n |

FIG.19

310 BINDING CACHE MANAGEMENT TABLE

| HOME ADDRESS (311) | C/O ADDRESS (312) | LIFETIME (313) | HR FLAG (314) | PROXY FLAG (315) | HOME ADDRESS ROUTING PREFIX LENGTH (316) | SEQ. No. (317) | BSA (318) | DYNAMIC (319) | |
|---|---|---|---|---|---|---|---|---|---|
| | | | | | | | | | ~310-1 |
| | | | | | | | | | ~310-2 |
| | | | | | | | | | ~310-n |

FIG.24

403 SIP INVITE MESSAGE EXAMPLE
(TERMINAL 4→SIP SERVER 5c)

start-line
- INVITE sip : userA@home.com SIP/2.0 message-header
- Via : SIP/2.0/UDP a4
- To : sip : userA@home.com
- From : sip : userC@home4.com ; tag=123
- Call-ID : 12345@a4
- CSeq : INVITE
- Contact : ⟨sip : userC@a4⟩
- Content-Type : application/sdp message-body
- v=0
- o=UserC 123 456 IN IP4 userC.home4.com
- c=IN IP4 a4
- m=audio 45678

FIG.25

404 SIP 302 MESSAGE EXAMPLE
(SIP SERVER 5a→TR 1a)

start-line
- SIP/2.0 302 MovedTemporarily message-header
- Contact : sip : userA%home.com@visit.com
- Via : SIP/2.0/UDP a4
- To : sip : userA@home.com
- From : sip : userC@home4.com ; tag=123
- Call-ID : 12345@a4
- CSeq : 1 INVITE
- Content-Length : 0

FIG.26

405 SIP INVITE MESSAGE EXAMPLE
(SIP SERVER 5c→TR 1b)

start-line: INVITE sip : userA%home.com@visit.com SIP/2.0 message-header:
Via : SIP/2.0UDP sipc4
　　　SIP/2.0/UDP a4
To : sip : userA@home.com
From : sip : userC@home4.com ; tag=123
Call-ID : 12345@a4
CSeq : 2 INVITE
Contact : ⟨sip : userC@a4⟩
Content-Type : application/sdp message-body:
v=0
o=UserC 123 456 IN IP4 userC.home4.com
c=IN IP4 a4
m=audio 45678

FIG.27

406 SIP 200 OK MESSAGE EXAMPLE
(MN3→SIP SERVER 5b)

start-line: SIP/2.0 200 OK message-header:
Via : SIP/2.0/UDP sipb6
　　　SIP/2.0UDP vsipc6
　　　SIP/2.0/UDP va6
To : sip : userA@home.com
From : sip : userC@home4.com ; tag=123
Call-ID : 12345@va6
CSeq : 2 INVITE
Contact : ⟨sip : userA@mn6⟩
Content-Type : application/sdp message-body:
v=0
o=UserA 123 456 IN IP6 visit.com
c=IN IP6 mn6
m=audio 45678

FIG.34

407 SIP 200 OK MESSAGE EXAMPLE
(TR 1b→SIP SERVER 5c)

start-line
{ SIP/2.0 200 OK message-header
{ Via : SIP/2.0UDP sipc4
　　　　SIP/2.0/UDP a4
To : sip : userA@home.com
From : sip : userC@home4.com ; tag=123
Call-ID : 12345@a4
CSeq : 2 INVITE
Contact : ⟨sip : userA@vpmn4 trbg4⟩
Content-Type : application/sdp message-body
{ v=0
o=UserA 123 456 IN IP4 visit.com
c=IN IP4 vpmn4 trbg4
m=audio 45678

FIG.36

408 SIP INVITE MESSAGE EXAMPLE
(TR 1b→SIP SERVER 5c)

start-line
{ INVITE sip : userC@home4.com SIP/2.0 message-header
{ Via : SIP/2.0/UDP vsipa4 trbg4
　　　　SIP/2.0/UDP vpmn4 trbg4
To : Bob⟨sip : userC@home4.com⟩
From : Alice ⟨sip : userA@home.com⟩ ; tag=123
Call-ID : 12345@vpmn4 trbg4
CSeq : 1 INVITE
Contact : ⟨sip : userA@vpmn4, trbg4⟩
Content-Type : application/sdp message-body
{ v=0
o=UserB 123 456 IN IP4 userA.home.com
c=IN IP4 vpmn4 trbg4
m=audio 45678

ADDRESS TRANSLATION EQUIPMENT, TERMINAL EQUIPMENT AND MOBILE COMMUNICATION METHOD

CROSS-REFERENCE TO RELATED APPLICATION

This application is a Continuation of nonprovisional U.S. application Ser. No. 10/330,306 filed on Dec. 30, 2002 now U.S. Pat. No. 7,328,281. Priority is claimed based on U.S. application Ser. No. 10/330,306 filed on Dec. 30, 2002, which claims the priority of Japanese Application 2002-156642 filed on May 30, 2002, all of which is incorporated by reference.

BACKGROUND OF THE INVENTION

The present invention relates to a method of providing mobile communication by interconnecting a network conforming to a protocol to a network conforming to the protocol or another protocol.

In recent years, there has been an animated discussion about introduction of an internet protocol (IP) to a mobile communication network. The internet engineering task force (IETF) is making efforts to standardize mobile IPv6. A network of the mobile IPv6 includes a mobile node (MN), a home agent (HA), and a correspondent node (CN).

A unique IP address (home address) is assigned to each mobile node, the IP address being kept unchanged regardless of movement of the mobile node. A link having a prefix equal to a prefix of the home address is called a home link. When the mobile node moves to or visits a link other than the home link, the mobile node obtains an IP address in the visited link. This address is called a care-of address (C/O address).

The home agent maintains a binding cache, i.e., a pair of a home address of a mobile node and a C/O address thereof.

When a mobile node detects a movement, the mobile node sends a control signal (binding update) to the home agent to request update of the binding cache. Having received the control signal (binding update), the home agent multicasts a message (gratuitous neighbor advertisement) to capture or to acquire a packet addressed to a mobile node existing on other than the home link. The home agent serves as a proxy of the mobile node.

The correspondent node (CN) is a node to communicate with the mobile node. According to the mobile IPv6 specifications, since the mobile node sends a mobile IPv6 message to the correspondent node, the correspondent node must also conform to the mobile IPv6.

Description will now be given of a procedure for the correspondent node to transmit a packet to the mobile node.

The correspondent node sends a packet addressed to the mobile node to the home address. The home agent intercepts the packet addressed to the home address. The home agent retrieves the binding cache according to the home address of the mobile node and obtains the C/O address of the mobile node. The home agent adds to the received packet a header to send the packet to the C/O address (encapsulation of the packet). The home agent then transmits the packet to the mobile node.

Having received the packet, the mobile node removes the header beforehand added to the packet (decapsulation of the packet) to restore the original IP packet.

On receiving the packet thus encapsulated, the mobile node retrieves a binding update list of the mobile node using the IP address of the correspondent node. The binding update list includes information of binding update message destinations.

When the binding update list does not include an entry for the correspondent node, the mobile node sends a control signal (Binding Update) to the correspondent node to notify the C/O address of the mobile node.

Having received the binding update message from the mobile node, the correspondent node registers a pair of the home address and the CIO address of the mobile node to the binding cache of the corresponding node. Thereafter, the correspondent node directly sends the packet to the C/O address of the mobile node for route optimization. In the IP header of the packet, the C/O address of the mobile node and the home address thereof are set to a source address field and an IPv6 routing header field, respectively.

On the other hand, with rapid spread of IP networks, the technique to interconnect areas or domains of mutually different address systems to each other becomes more important.

For example, a method (IETF RFC1631) using a network address translator (NAT) is known as a technique to interconnect a network conforming to a private address to a network conforming to a public address.

The network address translator conducts translation between a private IPv4 address and a public IPv4 address. The basic network address translator changes the source or destination address when a datagram passes the translator (NAT) between two areas connected to each other by an NAT router. When an address space of the private network collides with an address space of the public network, a twice NAT technique is often employed to solve the address collision. The twice NAT technique changes the source and destination addresses when a datagram passes the twice network address translator (NAT) between two areas connected to each other by a twice NAT router.

To solve the address collision, the twice NAT operates as follows. To initiate communication with Host-X in the public area, Host-A in the private area sends a query packet for a domain name system (DNS) address of Host-X. A domain name service-application level gateway (DNS-ALG) acquires the query packet, and translates an address for Host-x to an address (Host-X PRIME) routable in the private area, and then returns the packet to Host-A. When the DNS address resolution is finished, Host-A starts communication with Host-X PRIME. At a point of time when the packet passes the twice NAT, the source address is translated into an address that the NAT has and the destination address is translated into Host-X. Similar translation is conducted also for a response packet from Host-X. IETF RFC2694 describes operation of the DNS-ALG in detail.

This example is a technique used when a network to which a first terminal belongs and a network to which a second terminal communicating with the first terminal belongs conform to the same communication protocol. When the communication protocol differs between the networks, for example, when a network (IPv4 network) conforms to IPv4 and a network (IPv6 network) conforms to internet protocol version 6 (IPv6), the translation to interconnect the networks to each other is conducted using the known methods such as NAT-PT (IETF RFC2766), and SOCKS64 (IETF RFC3089).

In these methods, the format of the IP packet is translated between IPv4 and IPv6. For example, the address translation is conducted between IPv4 and IPv6. A system to conduct the translation will be referred to as a translator hereinbelow. For the translation, it is required to beforehand create a correspondence between IPv4 addresses and IPv6 addresses. The correspondence is kept stored in the translator. When the correspondence is dynamically created each time a communication takes place, name resolution of a domain name system (DNS) is used in an initial step of the creation.

The domain name system is a system to translate a name (character string; fully qualified domain name (FQDN)) easily understood by a human such as a uniform resource locator (URL) of the web into an IP address. An operation to translate a name into an IP address will be referred to as name resolution hereinbelow. Today, almost all applications on the internet acquire an IP address of its communicating party or partner using the domain name system.

To start communication, the network address translator and the protocol translator continuously monitor DNS messages communicated before starting the communication, using the fact described above. The translator uses a query message for name resolution as a trigger to create translation information (such as a correspondence of IP addresses). Specifically, when an IPv6 terminal conducts name resolution for a name and a response thereto is an IP address of IPv4, the IPv4 terminal translates the IPv4 address into an IPv6 address and sends the IPv6 address to the IPv6 terminal. The IPv4 terminal establishes a correspondence between the IPv4 address before translation and the IPv6 address after translation. That is, the gateway (DNS-ALG) acquires the response message of name resolution to dynamically create translation information on the basis of the information items before and after translation.

A technique to transmit voice and sound via IP networks has been enthusiastically discussed today. Voice over internet protocol (VoIP) is a technique to transmit audio information via IP networks. The protocol (VoIP) first sets a temporary speech channel path (session) between two communication units or devices. Audio data configured in an IP packet is transferred through the communication path or route thus prepared. A session control protocol is required to control operation to establish a session between the communication units, to keep the session, and to disconnect the session.

The internet engineering task force (IETF) has stipulated specifications of a session initiation protocol (SIP; IETF RFC2543) to establish and to terminate a session for IP multimedia communication. The protocol (SIP) attracts attention as a VoIP session control protocol because of its high expandability of functions.

The session initiation protocol is an application protocol using a transport mechanism such as a transmission control protocol (TCP) and a user datagram protocol (UDP). The session initiation protocol is a text-based protocol and includes a header to transport a request or a response and a message body in which the contents of the session are described. For example, a session description protocol (SDP; IETF RFC2327) is used to describe the SIP session.

The session initial protocol uses architecture of a client-server model. The source client sends a SIP request to a proxy (a SIP server) of the destination client. The SIP server conducts address resolution of the destination of communication using the domain name system (DNS) or the like to establish a session between the terminals.

The SIP server is in a proxy mode or a redirect mode according to its function. The proxy mode is a method in which a proxy server mediates a session establishing request between a source client and a destination client. The redirect mode is a method in which the source client directly connects with the destination client using information of the destination obtained from a SIP redirect server.

Description will next be given of a SIP connection procedure using a SIP server in the proxy mode. When a terminal x on an IP network initiates audio communication with a terminal y using the session initiation protocol, the terminal x sends a call setting request (INVITE) to the SIP server. The SIP server determines location information of the terminal y and sends a call setting request thereto. The terminal y sends a response indicating reception of the call. The response is sent to the terminal x via the SIP server through which the call setting request has passed. The terminal x sends an ACK request to the terminal y to confirm reception of the response. The ACK request is transferred by the SIP server or is directly sent to the terminal y. As a result, the terminal x can communicate with the terminal y. Ordinarily, a call setting request and a response thereto include information (session description) to transfer user information (an audio packet) between the terminals x and y. The session description protocol or the like is used to prepare the session description. The terminal x (y) sends the user information to a destination specified by the terminal y (x).

The session initiation protocol identifies the communicating party using a SIP uniform resource identifier (SIP URI). A SIP client resisters location information to a registrar server. For example, an IP address is set as the location information. The registrar server sends the location information to a location server. The location server keeps a correspondence between SIP URI and the location information. The registrar server and the location server may be installed in the SIP server.

According to SIP and SDP specifications, information items of a terminal and a SIP server can be specified by IP addresses.

International telecommunication uniorn-telecommunication sector (ITU-T) has standardizes the ITU-T recommendation H.323 stipulating an encoding method and a call control method to handle audio and video information on a network, for example, the internet and a local area network (LAN) on which a bandwidth is not guaranteed. The recommendation H.323 is prepared for packet-based multimedia communication systems and are applicable to the protocol (VoIP). An H.323 system mainly includes a terminal, a gateway, and a gatekeeper. The gatekeeper has an address translation function and a bandwidth management function for a terminal and a gateway to access a local area network. Messages and protocols for the call control method and a data transfer method are standardized by the ITU-T recommendations H.225 and H.245.

The recommendation H.323 identifies a terminal by an alias address. The gatekeeper manages information of correspondence between alias addresses and transport addresses. For example, an IP address is set to the transport address.

With spread of the VoIP service, the internet engineering task force and ITU-T are discussing assignment of a telephone number (E.164 number or the like) to a VoIP terminal. An ENUM domain name system (DNS) establishes a correspondence between a telephone number and a uniform resource identifier (URI; SIP URI, H.323 alias address, etc.) The system (ENUM DNS) is based on the DNS architecture and protocol and is stipulated by RFC2916. A node to issue a query to the ENUM DNS translates a telephone number into an FQDN format and sends the query to the ENUM DNS. The ENUM DNS translates information of the FQDN into a uniform resource identifier beforehand registered on the destination side.

SUMMARY OF THE INVENTION

When address translation equipment or an address translation unit interconnects an area A to an area B and a first terminal belonging to the area A communicates with a second terminal belonging to the area B, an address translation unit through which a first packet passes manages a correspondence of addresses between the areas A and B. Therefore, after the first and second terminals start communication, any packet communicated therebetween passes through the address translation unit.

For example, after the communication is started, a route optimization request transmitted from a mobile node (MN) conforming to the mobile IPv6 to a terminal conforming to IPv4 passes through a particular address translation unit. This consequently leads to a problem. That is, when the mobile node exists in other than the home link, it is impossible to optimize the route between the mobile node and the IPv4 terminal.

In the IPv4 address system today, almost all terminals for consumers are each dynamically assigned with an IP address by an internet service provider (ISP). However, when a home address is dynamically assigned to the mobile node, there arises a problem that a packet addressed to the mobile node cannot be appropriately delivered thereto.

The IPv4 addresses are less in number than the IPv6 addresses. This results in a problem. When the number of mobile nodes to communicate with IPv4 terminals increases, the IPv4 addresses for the address translation unit to create address translation entries become insufficient.

It is therefore an object of the present invention to provide a mobile communication system in which when a terminal x belonging to an area A communicates with a terminal y belonging to an area B, route optimization can be conducted between the terminals x and y even if an address system of the area A differs from an address system of the area B.

Another object of the present invention is to provide a mobile communication system in which even if a home address is dynamically assigned to a mobile node, a packet can be delivered to the mobile node.

Another object of the present invention is to provide a mobile communication system in which when an address translation unit interconnects an area A to an area B and a terminal x belonging to the area A communicates with a terminal y belonging to the area B, the terminals x and y can communicate with each other even if the number of addresses routable in the area B is less than that of addresses in the area A.

To solve the problem, according to the present invention, at least three measures are additionally provided in the protocol translation system of the prior art as below.
(1) Each address translation unit includes a part to process a mobile IP protocol to provide a mobile communication service.
(2) A mobile node conforming to the mobile internet protocol includes a part to dynamically acquire a home address and a part to register, when the mobile node acquires a home address, the home address to the address translation unit.
(3) To uniquely identify the mobile node, a SIP identifier (SIP URI) is assigned to the mobile node, and the mobile node includes a part to register a home address to the SIP server.
(4) The address translation unit may include a part which assigns a private address as a routable address in IPv4 to the mobile node and which notifies, when the address translation unit notifies address information of the mobile node to a terminal on an IPv4 network, information of the address translation unit together with the private address assigned to the mobile node as well as a part to encapsulate and to decapsulate a packet.

Other objects, features and advantages of the invention will become apparent from the following description of the embodiments of the invention taken in conjunction with the accompanying drawings.

BRIEF DESCRIPTION OF THE DRAWINGS

FIG. 9 is a diagram showing example 1 of a SIP register message.

FIG. 10 is a diagram showing example 2 of a SIP register message.

FIG. 11 is a diagram showing an example of a router advertisement message.

FIG. 16 is a diagram showing a translation information table of the address translation unit.

FIG. 17 is a diagram showing example 1 of a SIP information management table of a SIP server.

FIG. 18 is a diagram showing example 2 of a SIP information management table of a SIP server.

FIG. 19 is a diagram showing a binding cache management table of the address translation unit.

FIG. 24 is diagram 1 showing an example of a SIP invite message.

FIG. 25 is a diagram showing an example of a SIP 302 message.

FIG. 26 is diagram 2 showing an example of a SIP invite message.

FIG. 27 is a diagram showing an example of a SIP 200 OK message.

FIG. 34 is a diagram showing an example of a SIP 200 OK message in the fourth embodiment.

FIG. 36 is a diagram showing an example of a SIP invite message in the fourth embodiment.

DESCRIPTION OF THE EMBODIMENTS

Figure 1:
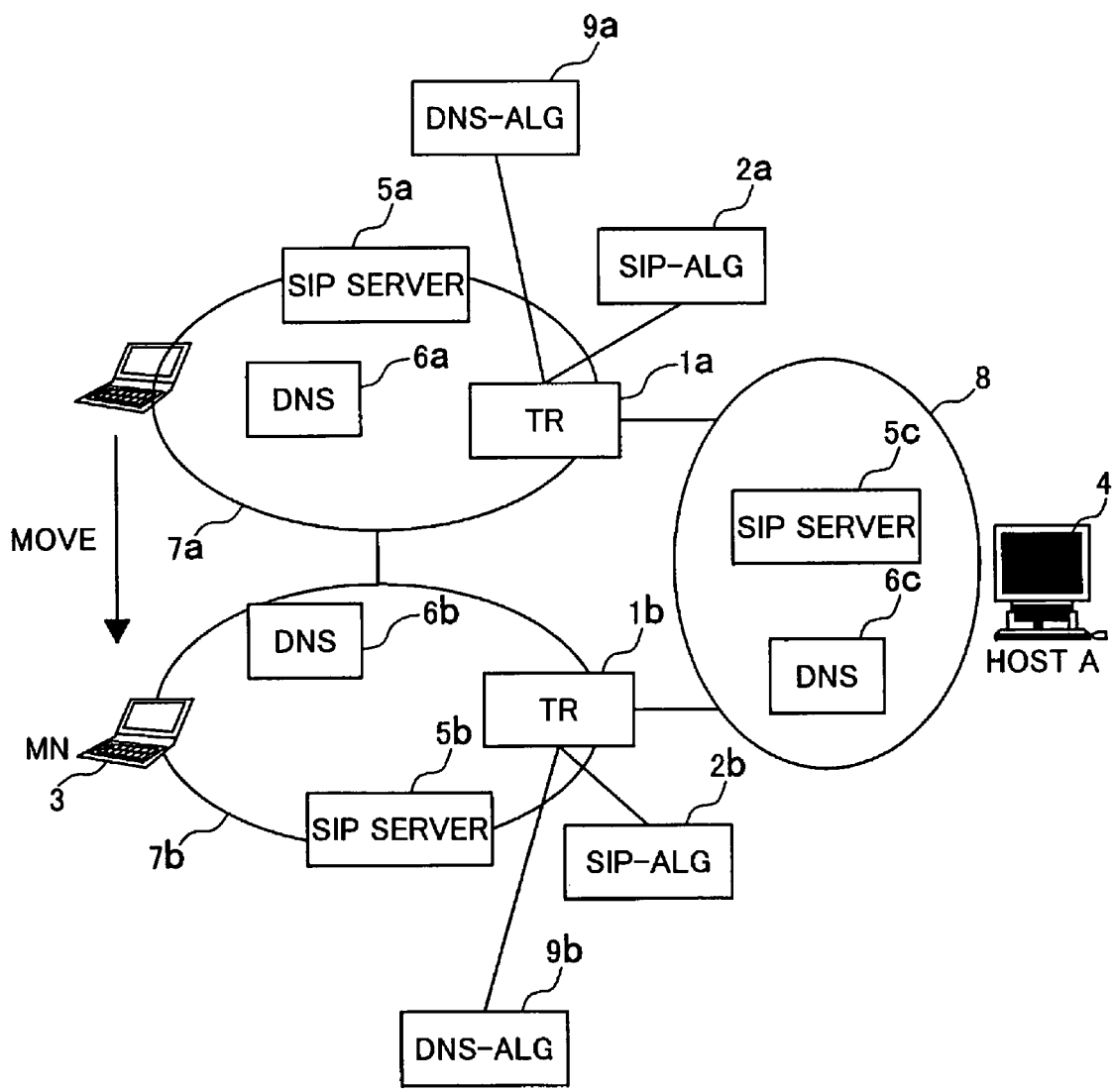
FIG. 1 is a diagram showing a configuration of a communication network according to a first embodiment of the present invention.

Referring now to the drawings, description will be given of a first embodiment according to the present invention.

Description will be given in detail of a representative example in which a mobile node (MN) conforming to the mobile IPv6 on a visited network of the mobile node starts communication with an IPv4 terminal.

FIG. 1 shows an example of a communication network in which the mobile node communicates with the IPv4 terminal according to the present invention. The communication network includes networks 7 and 8. In the embodiment, the networks 7 (7a, 7b) are mobile IPv6 networks and the network 8 is an IPv4 network. Address translation units (TR) 1 (1a, 1b) respectively interconnect the networks 7 with the network 8.

The mobile IPv6 network 7a includes a SIP servers 5a and a DNS server 6a, and the mobile IPv6 network 7b includes a SIP servers 5b and a DNS server 6b. A mobile node 3 is a mobile node conforming to the mobile IPv6.

The network 8 includes a SIP server 5c, a DNS server 6c, and a terminal 4.

The address translation unit 1 includes a mobile IPv6 message processing function, a function to conduct address translation between IPv4 and IPv6 addresses, a unit to communicate with a SIP application level gateway (SIP-ALG) 2, and a unit to communicate with a DNS application level gateway (DNS-ALG) 9.

Figure 4:
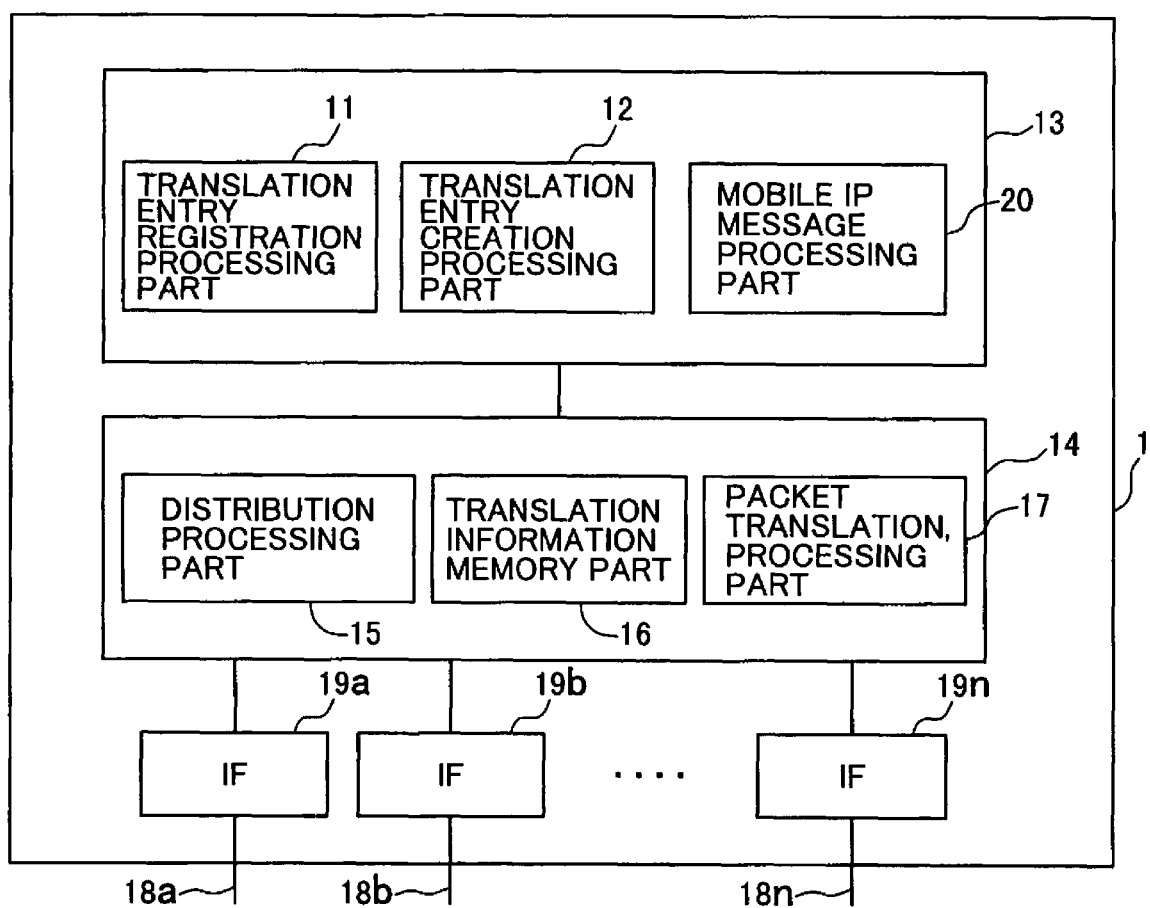
FIG. 4 is a block diagram showing a configuration of an address translation unit.

FIG. 4 shows an example of the address translation unit 1. The unit 1 includes interface units (IF; 19a, 19b, . . . , 19n) to accommodate communication lines (18a, 18b, . . . , 18n), a packet transfer, a processing group 14, and a packet transfer control group 13.

The packet transfer, processing group 14 includes a distribution processing part 15, a translation information memory part 16, and a packet translation, processing part 17. The distribution processing part 15 includes a function to detect a SIP message, a DNS message, and a mobile IP message. The translation information memory part 16 includes a translation information table 500 to store information necessary for address translation. The packet translation, processing part 17 includes a function to translate a data packet.

FIG. 16 shows an example of a table configuration of the translation information table 500. The table 500 stores a correspondence between an IPv4 address 501 and an IPv6 address 502.

When an IPv4 (IPv6) packet is received, the packet translation, processing part 17 makes a search through the translation information memory part 16 to translate an IPv4 (IPv6) address into an IPv6 (IPv4) address. In the operation, the part 17 also translates various information other than the IP address.

Figure 6:
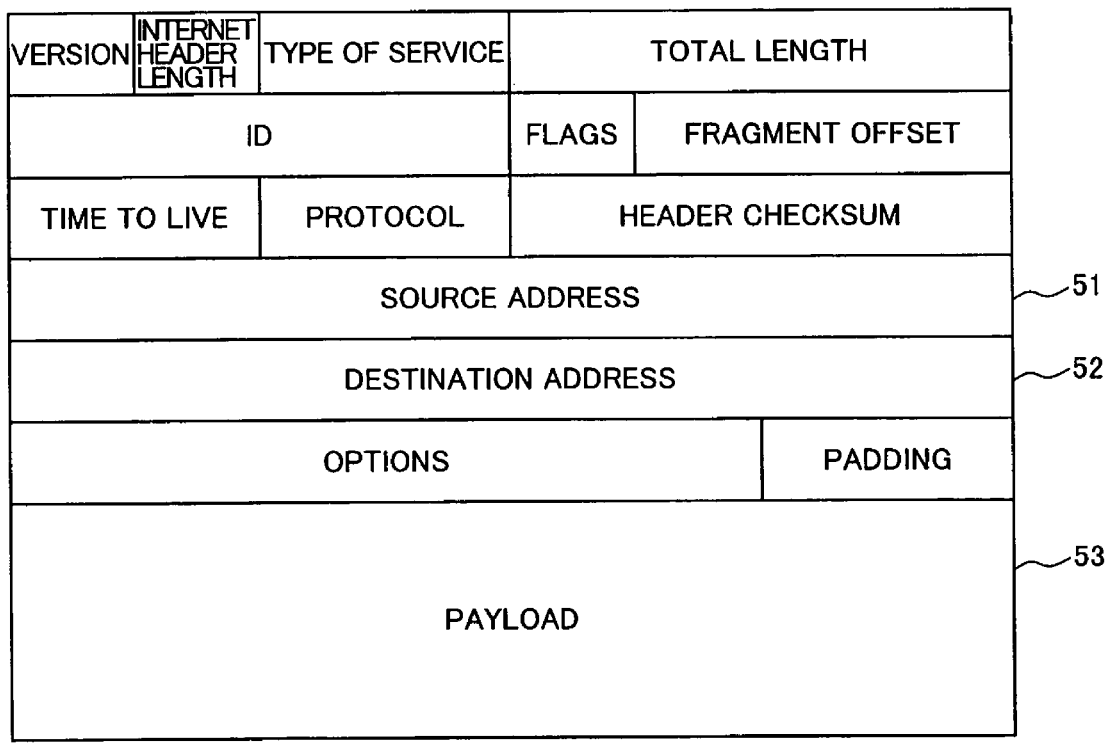
FIG. 6 is a diagram showing a format of an IPv4 packet.
Figure 7:
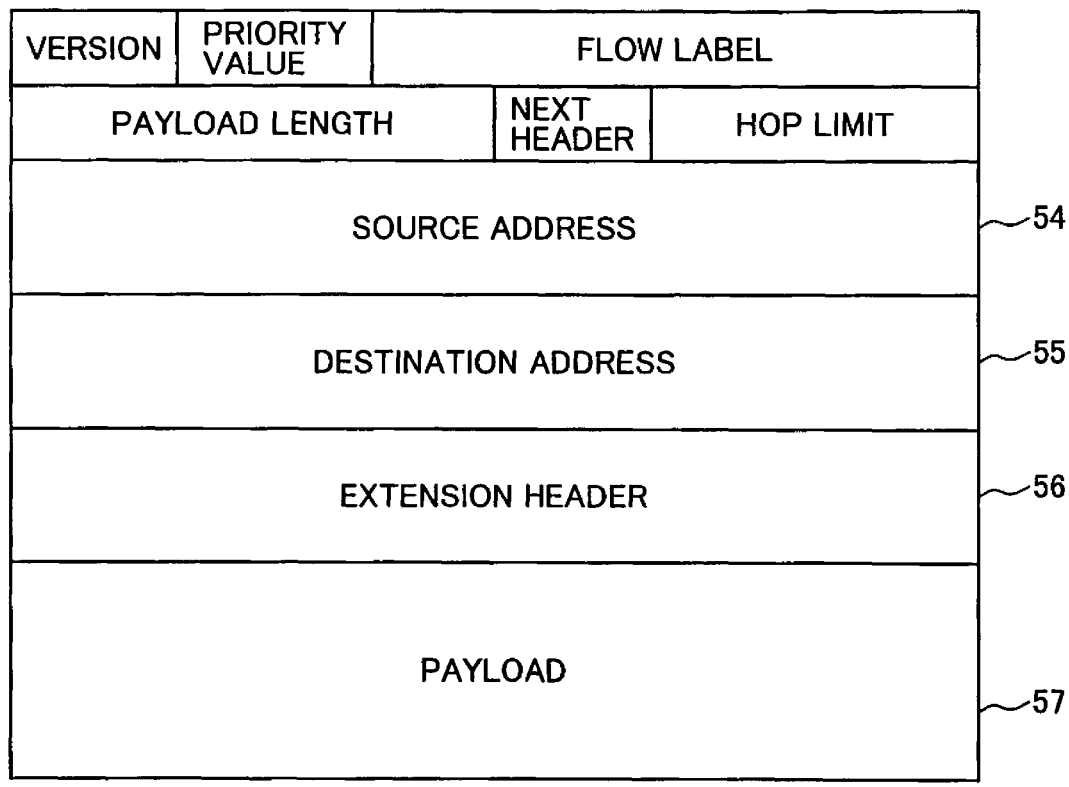
FIG. 7 is a diagram showing a format of an IPv4 packet.

FIG. 6 shows a format of an IPv4 packet and FIG. 7 shows a format of an IPv6 packet.

In the address translation, not only the IP address but also the format is also translated.

Returning to FIG. 4, the address translation unit 1 will be described.

The packet transfer control group 13 includes a translation entry registration processing part 11, a translation entry creation processing part 12, and a mobile IP message processing part 20.

The translation entry registration processing part 11 registers translation information to the translation information memory part 16.

The translation entry creation processing part 12 includes an address pool to translate an IPv6 (IPv4) address into a routable address on an IPv4 (IPv6) network and a function to create address translation information.

The mobile IP message processing part 20 includes a mobile IP protocol processing function, a home agent (HA) function, a binding cache management table 310, and a binding update processing routine 60.

FIG. 19 shows an example of a table layout of the binding cache management table 310. The table 310 relates a home address 311 to a C/O address 312, a lifetime 313, an HR flag 314, a proxy flag 315, a home address routing prefix length 316, a sequence number 317, a security association (BSA) 318, and a dynamic flag 319.

Figure 5:
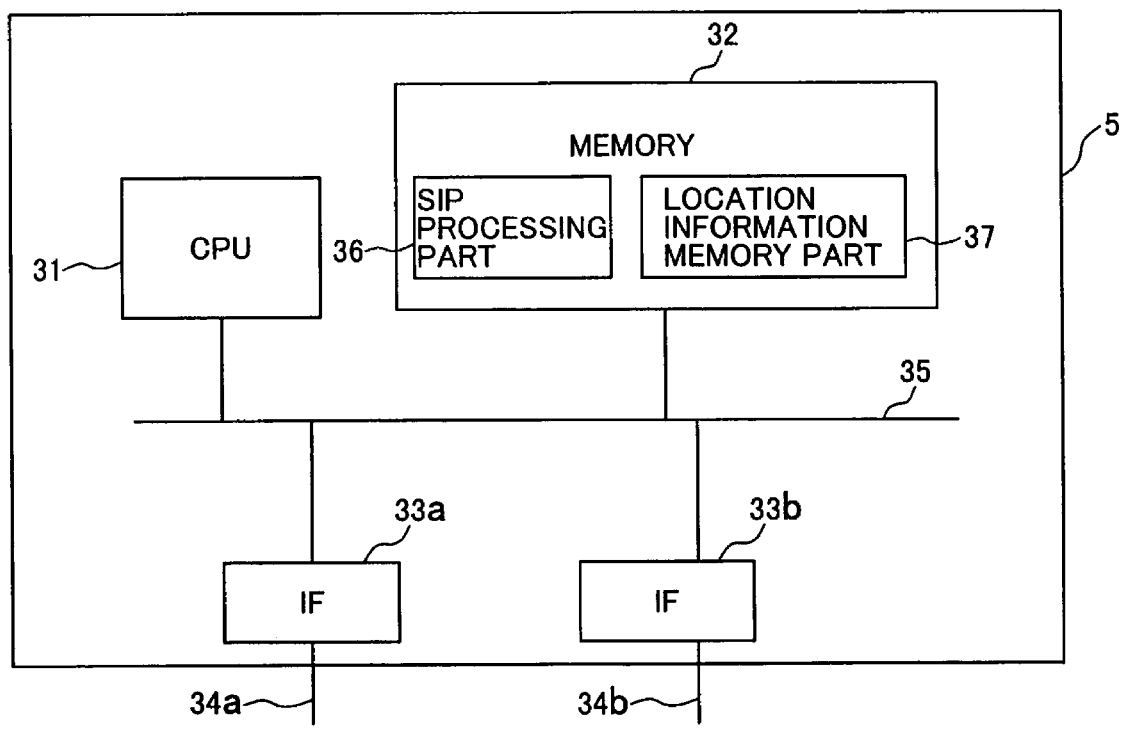
FIG. 5 is a block diagram showing a configuration of a SIP server.

FIG. 5 shows a configuration example of the SIP server 5. The server 5 includes interface units (IF) 33 (33a, 33b) to respectively accommodate communication lines 34 (34a, 34b), a memory 32, a central processing unit (CPU) 1, and a bus 35 connecting the constituent components to each other.

The memory 32 stores a SIP processing part and a location information memory part 37.

The SIP processing part 36 includes a SIP protocol function and a SIP server function.

The location information memory part 37 includes a registrar server function and a location server function. The location server function of the part 37 includes a SIP information management table.

FIG. 17 shows an example of a table configuration of a SIP information management table 510 of the SIP server 5a on the network 7a.

FIG. 18 shows an example of a table configuration of a SIP information management table 520 of the SIP server 5b on the network 7b.

The table 510 (520) stores a correspondence between SIP-URI 511 (521) and location information 512 (522).

Figure 3:
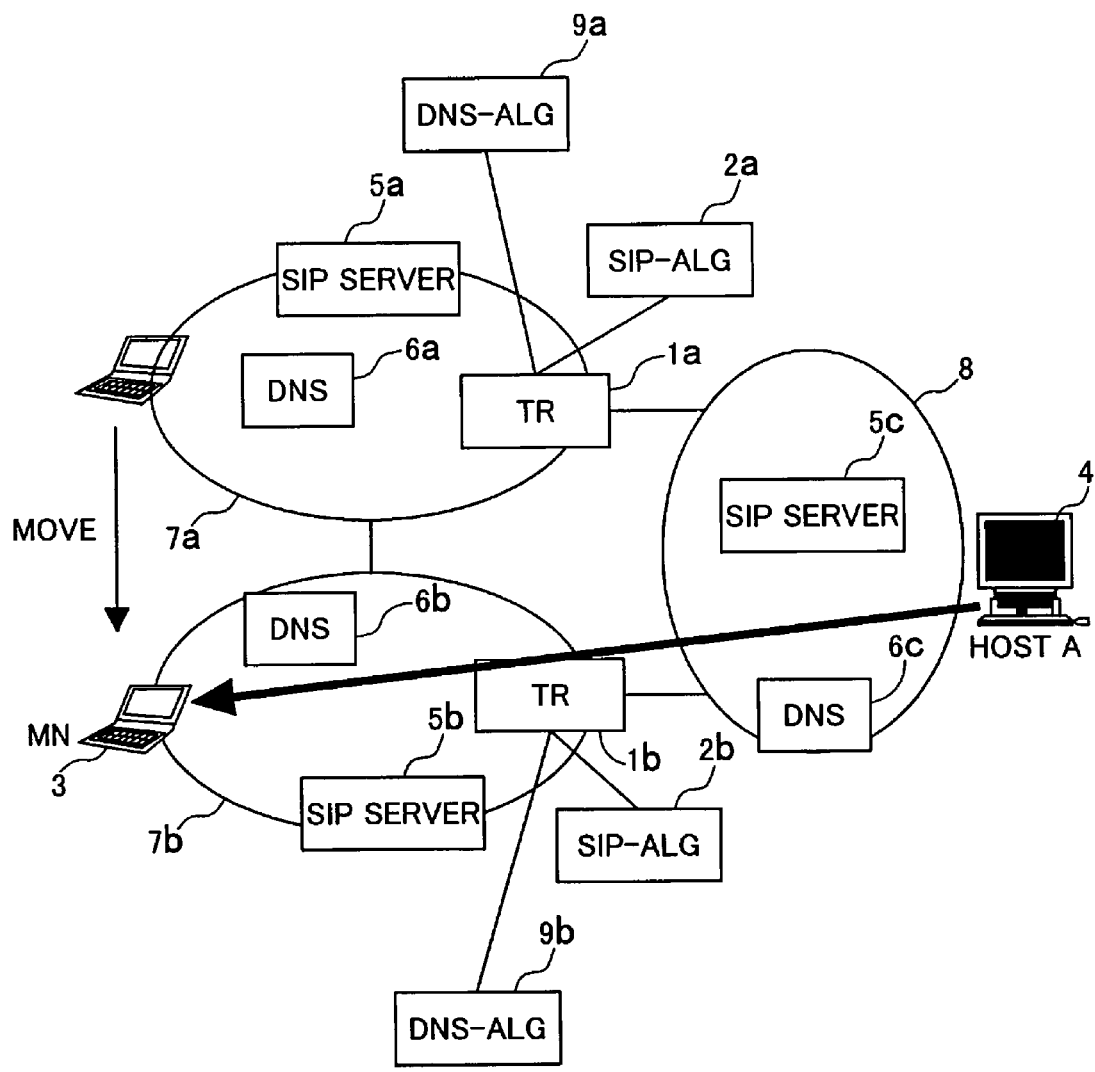
FIG. 3 is a diagram showing a packet route when a mobile node conforming to the mobile IPv6 has not a fixed home address in the communication network according to the present invention.

FIG. 3 shows a communication route for the terminal 4 on the network 8 to communicate with the mobile node 3 having registered its location on the network 7b.

Referring to the sequences shown in FIGS. 20, 22, and 23, description will be given of a communication sequence for the mobile node 3 existing on the network 7 to communicate with the terminal 4 on the network in FIG. 3.

Figure 20:
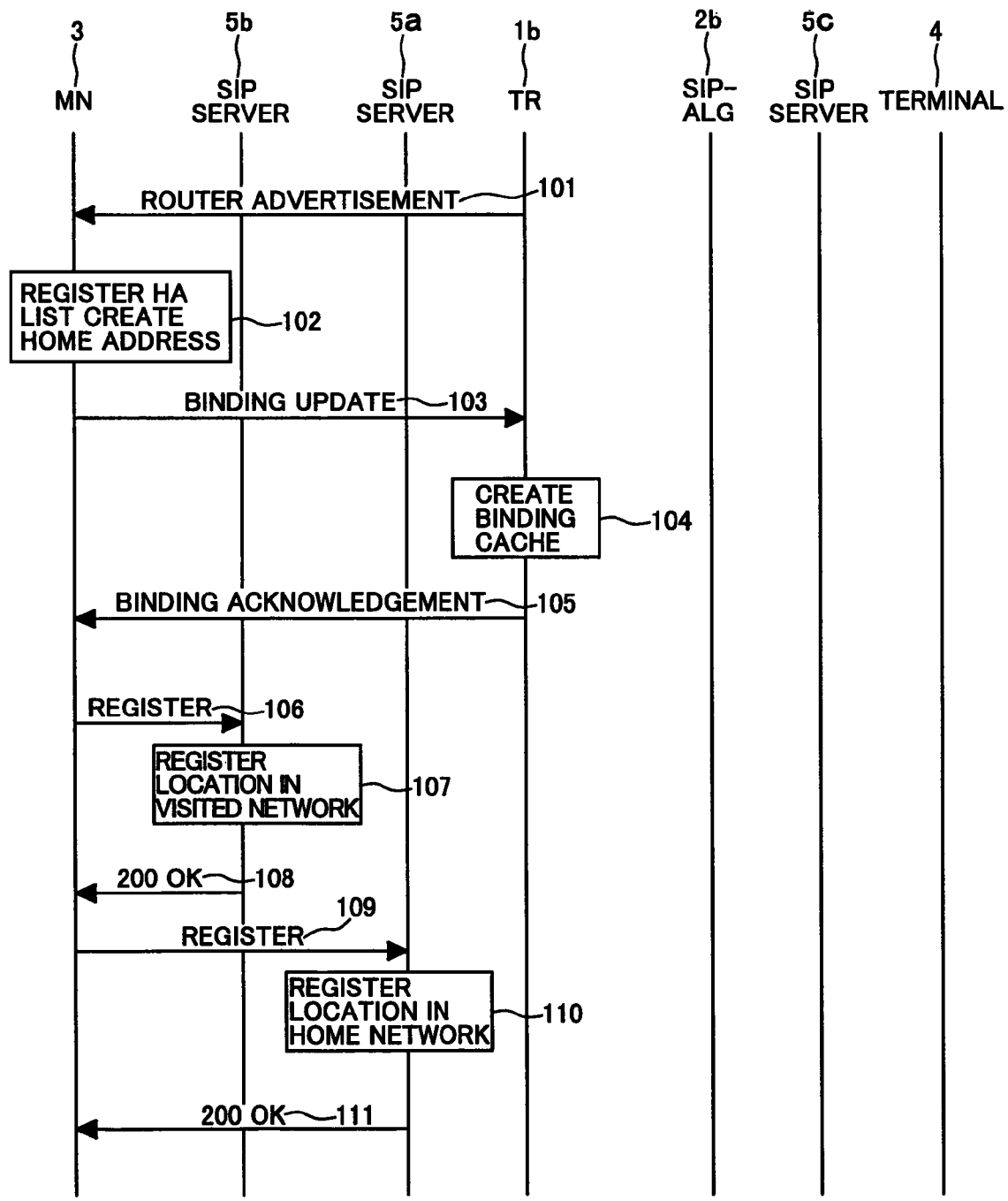
FIG. 20 is a sequence chart showing a location registration sequence according to the present invention.

FIG. 20 shows a location registration procedure of the mobile node 3 on the network 7b.

Assume that the mobile node 3 dynamically acquires a home address on the network 7b. Assume also that the mobile node 3 is identified by a SIP-URI (userA@home.com) on the home network 7a and is identified by a SIP-URI (userA%home.com@visit.com) on the visited network 7b.

The mobile node 3 moved to the network 7b receives a router advertisement message from the address translation unit (TR) 1b (101).

FIG. 11 shows a format example 420 of the router advertisement message. The router advertisement message 420 is stored in a payload field 57 of the IPv6 packet format shown in FIG. 7.

When an H bit is set to the router advertisement message, the mobile node 3 regards the message as a router advertisement issued from the home agent. When an R bit is set to a prefix information option 422, the mobile node 3 registers an address contained in the prefix to an HA list as an HA address. The mobile node 3 acquires a prefix of the mobile node 3 using a prefix length of the prefix information option 422 and the address contained in the prefix to create a home address of the mobile node 3 (102).

When the H bit is not set to the router advertisement message, the mobile node 3 creates a home address of the mobile node 3 using the prefix length of the prefix information option 422 of the router advertisement and the address contained in the prefix. Next, the mobile node 3 retrieves a home agent of the mobile node 3 using a dynamic home agent discovery function.

Returning to FIG. 20, the communication sequence will be described. Having created the home address, the mobile node 3 sends a message (Binding Update) requesting registration of the home address to the address translation unit 1b having the home agent (HA) function (103).

Figure 12:
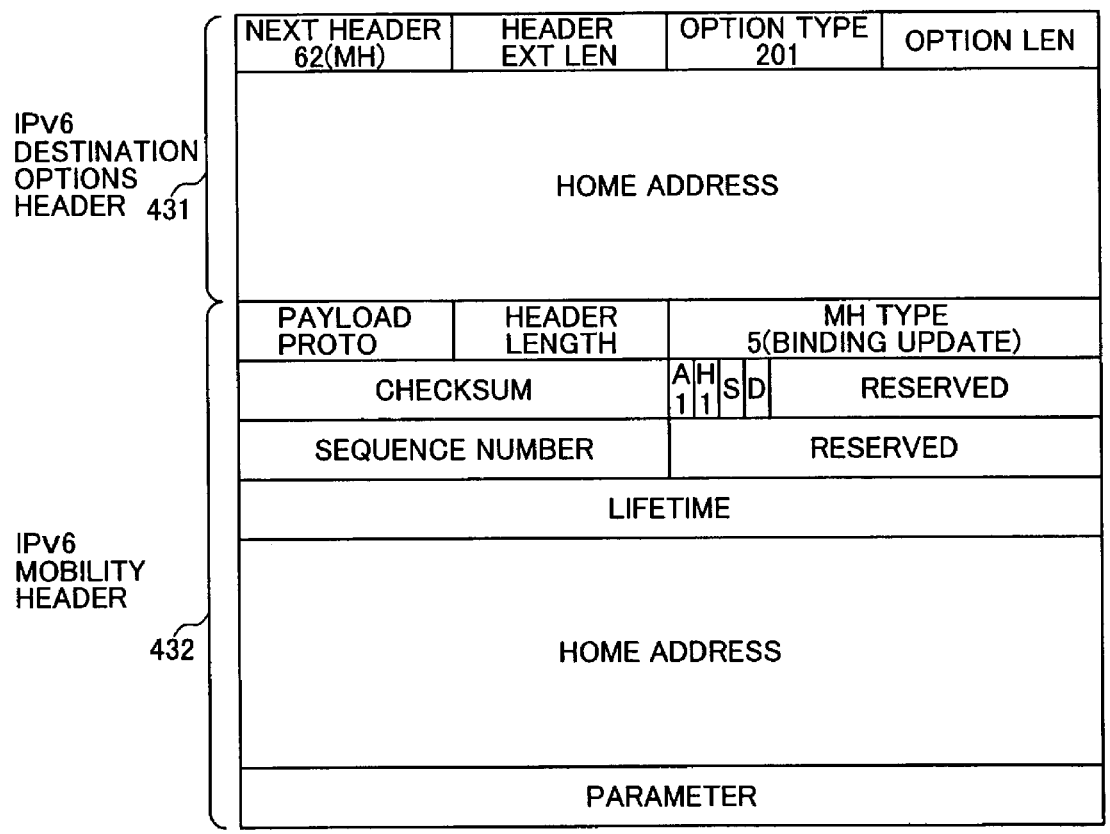
FIG. 12 is a diagram showing an example of a binding update message.

FIG. 12 shows a format example 430 of the binding update message. An IPv6 destination options header 431 and an IPv6 mobility header 432 are stored in an extension header 56 of the IPv6 packet format shown in FIG. 7.

The binding update message from the mobile node 3 to the address translation unit 1b contains values as below. The home address created in step 102 is set to a source IP address 54 of the IPv6 packet header, a home address option of the IPv6 destination options header 431, and a home address of the IPv6 mobile header 432. A value more than zero is set to a lifetime field of the IPv6 mobile header 432.

Figure 21:
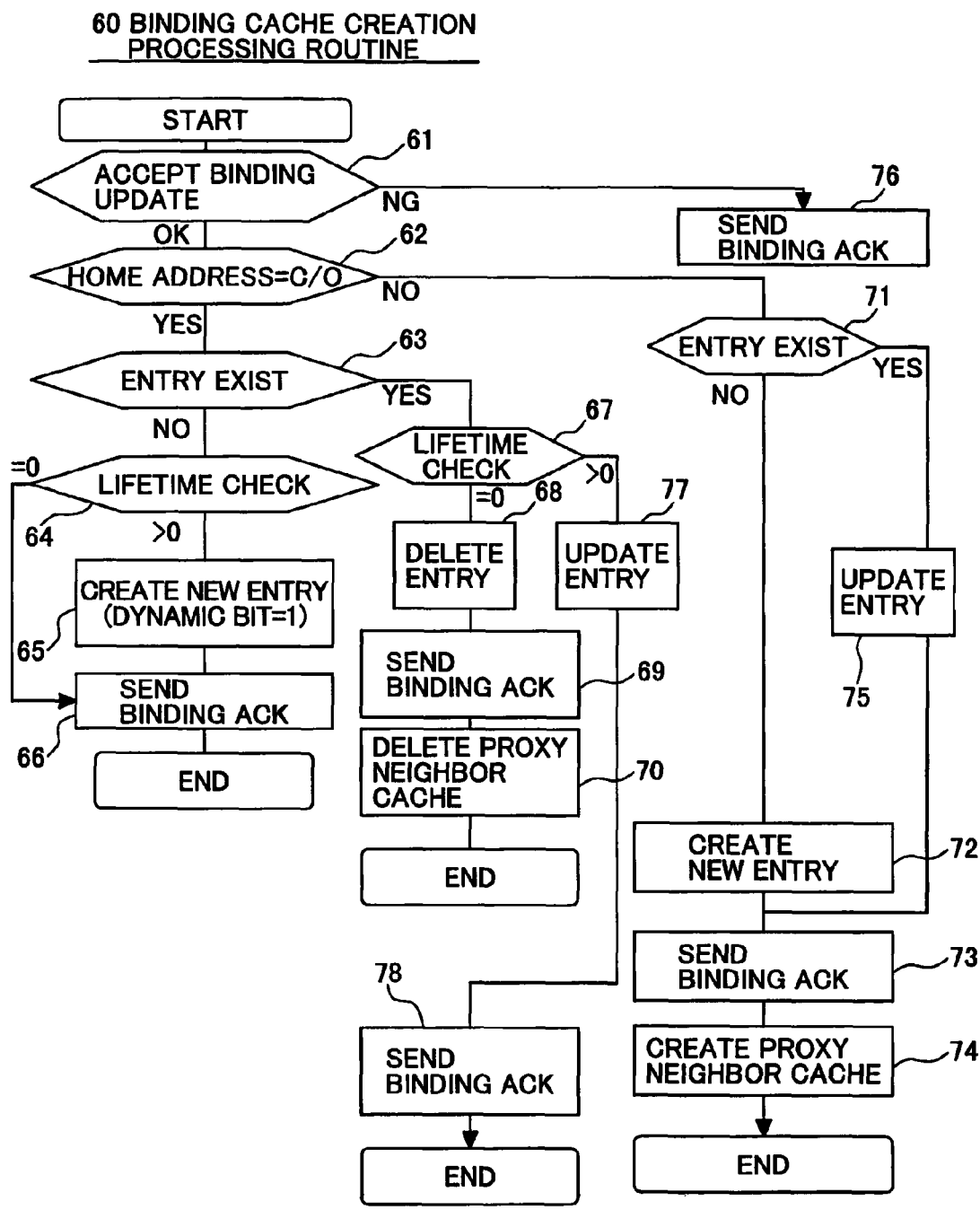
FIG. 21 is a flowchart showing a binding cache creation processing routine of the address translation unit.

Having received the binding update message, the address translation unit 1b activates a binding cache creation processing routine 60 shown in FIG. 21.

FIG. 21 shows the routine 60 in a flowchart. In a state ready to receive the binding update message (61), the address translation unit 1b compares the source IP address of the IPv6 packet containing the binding update message with the home address in the IPv6 destination options header and that contained in the IPv6 mobility header (62). If the source IP address is equal to the home address, the address translation unit 1b makes a search through the binding cache management table 310 for an entry at the address (63). If the entry is absent, the translation unit 1b examines the lifetime value in the IPv6 mobility header (64). If the value is more than zero, the translation unit 1b adds a new entry to the binding cache management table 310 (65, 104). The translation unit 1b sets "1" to a dynamic field 319 of the new entry. This indicates that the entry belongs to a mobile node of which the home address has been dynamically acquired. To the mobile node 3, the translation unit 1b sends a response (Binding Acknowledgement) to the binding update message (66, 105) and terminates the routine.

Figures 13, 14:
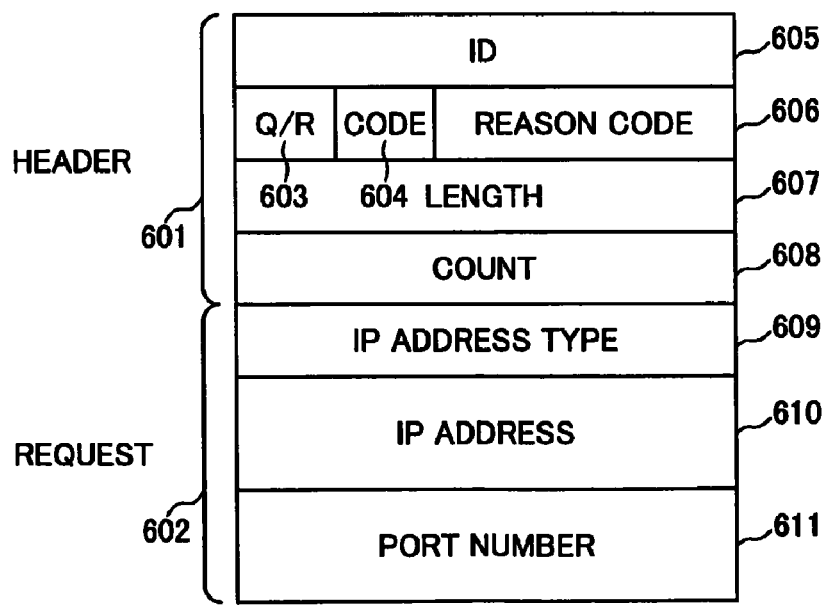
FIG. 13 is a diagram showing an example of a binding acknowledgement message.
FIG. 14 is a diagram showing a format of an address query message.

FIG. 13 shows a format example 440 of the binding acknowledgement message.

In step 63, if an entry exists at the address in the binding cache management table 310 of the address translation unit 1b, the translation unit 1b examines the lifetime value of the IPv6 mobility header (67). If the value is zero, the translation unit 1b deletes the entry from the table 310 (68). The translation unit 1b sends a binding acknowledgement message to the mobile node 3 (69), deletes the proxy neighbor cache (70), and terminates the routine.

In step 67, if a valid value is set to the lifetime field, the address translation unit 1b updates the lifetime value of the entry (77). The translation unit 1b then sends a binding acknowledgement message to the mobile node 3 (78) and terminates the routine.

If the binding update message cannot be accepted in step 61, the translation unit 1b sends a binding acknowledgement message including an error indication to the mobile node 3 and terminates the routine (76).

If the lifetime value is zero in step 64, the translation unit 1b sends a binding acknowledgement message to the mobile node 3 and terminates the routine (66).

If the source IP address differs from the home address in step 62, the address translation unit 1b searches the binding cache management table 310 for an entry at the address (71). If the entry is absent, the translation unit 1b examines the lifetime value of the IPv6 mobility header. If the lifetime value is valid, the translation unit 1b adds a new entry to the table 310 (72). For the new entry, the unit 1b does not set a flag to the dynamic field. To the mobile node 3, the translation unit 1b multicasts a response (binding acknowledgement) to the binding update message (73). To acquire a packet addressed to the home address of the mobile node 3, the translation unit 1b sends a gratuitous neighbor advertisement message, creates a proxy neighbor cache (74), and terminate the routine.

If the entry exists in step 71 and the received message includes a valid lifetime value, the translation unit 1b updates the lifetime value of the entry (75).

Returning to FIG. 20, the communication sequence will be described.

Having received the binding acknowledgement message, the mobile node 3 sends a SIP message (register) to the SIP server 5b on the network 7b to request registration of location information of the mobile node 3 (106).

Figure 8:
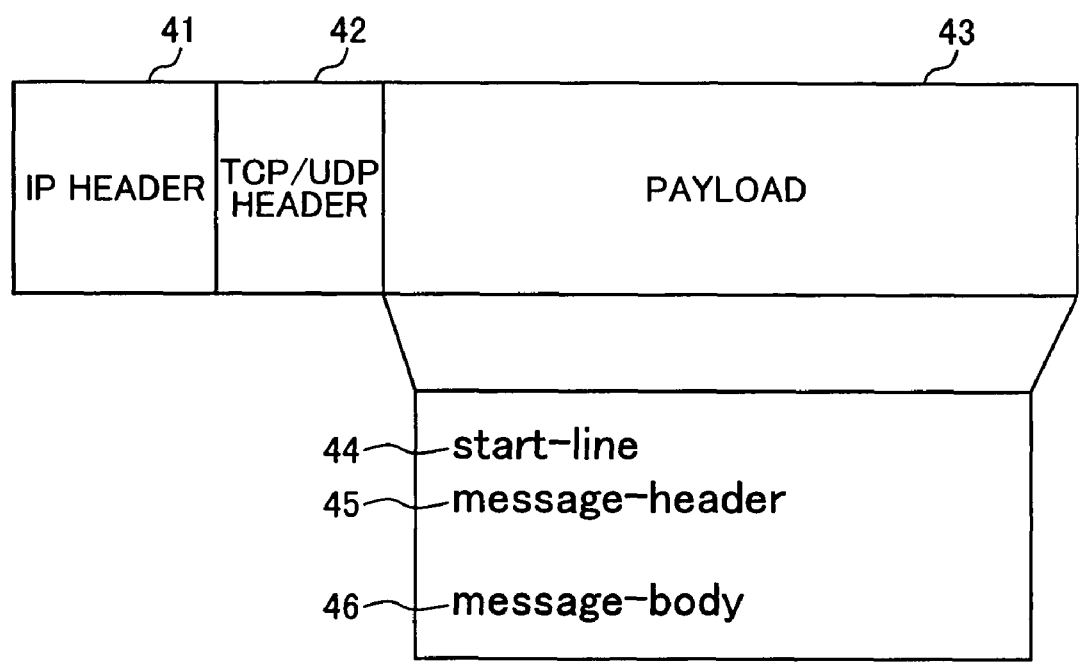
FIG. 8 is a diagram showing a format a SIP message.

FIG. 8 shows a protocol stack and a message format of SIP. A packet of SIP includes an IP header 41, a TCP/UDP header 42, and a payload 43. The payload 43 stores information of SIP. The SIP information includes a start-line field 44, a message-header field 45, and a message-body field 46. The start line 44 indicates a type and a destination of the SIP message. The message header 45 includes a SIP parameter. The message body 46 indicates information of a connection logically established between terminals. The message body is described using, for example, the protocol (SDP).

FIG. 9 shows a message example 401 of the SIP message (register) from the mobile node 3 to the SIP server 5b. A domain name of the SIP server 5b to conduct registration is set to a start-line field. A to-header field indicates an update objective item. A contact-header field indicates information to be registered to the registrar server. The mobile node 3 sets to the contact-header field a home address (mn6) acquired on the network 7b.

Returning to FIG. 20, the communication sequence will be described. Having received the SIP message (register), the SIP server 5b adds an entry 520-1 to the SIP information management table 520 (107). The entry 520-1 keeps a correspondence between the SIP-URI (userA%home.com@visit.com) of the mobile node 3 on the network 7b and location information (userA@mn6) including the home address (mn6) created in step 102. To the mobile node 3, the SIP server 5b sends a response message (200 OK) to the SIP message (register; 108).

The mobile node 3 then transmits an SIR message (register) to the SIP server 5a on the home network 7a to request registration of location information of the mobile node 3 (109).

FIG. 10 shows a message example 402 of the SIP message (register) from the mobile node 3 to the SIP server 5a. In the SIP message 402, the SIP-URI (userA@home.com) of the mobile node 3 on the network 7a is set to the to-header field and location information of the mobile node 3, i.e., SIP-URI (userA%home.com@visit.com) of the mobile node 3 on the network 7b is set to the contact-header field.

Having received the SIP message (register), the SIP server 5a adds an entry 510-1 to the SIP information management table 510 (110). To the mobile node 3, the SIP server 5a sends a response message (200 OK) to the SIP message (register; 111).

Figure 22:
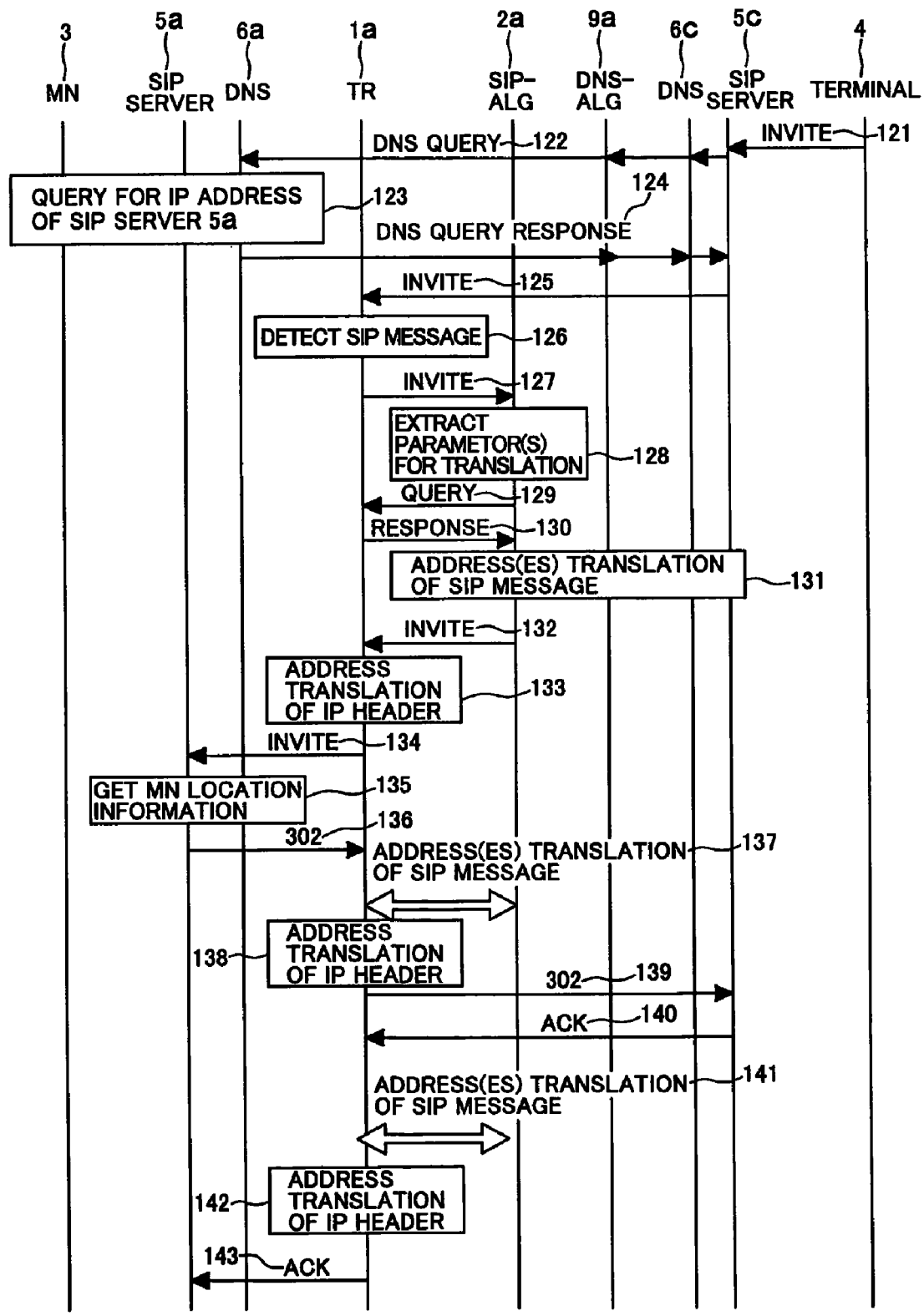
FIG. 22 is sequence chart 1 showing a communication sequence between a terminal and a mobile node according to the present invention.
Figure 23:
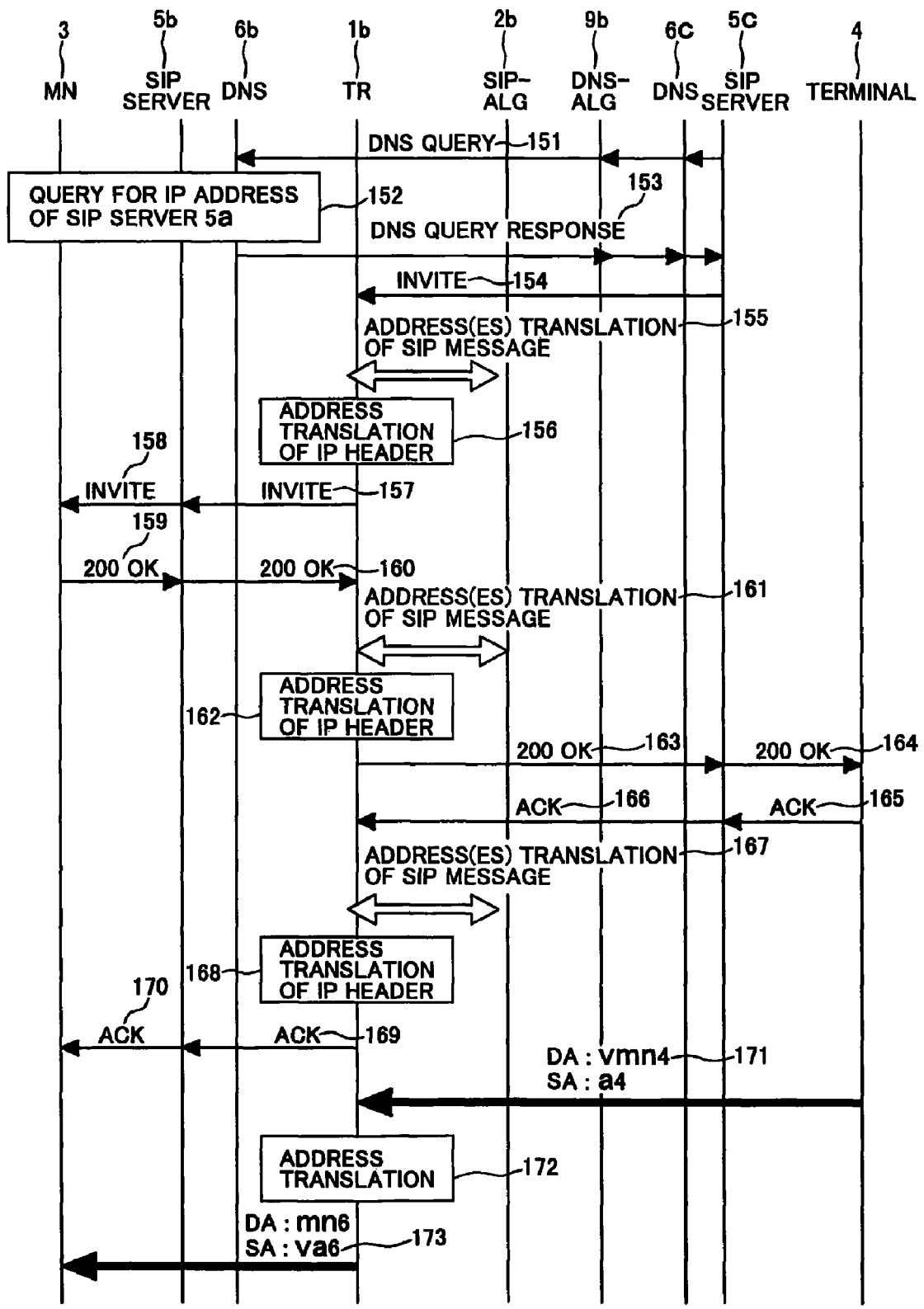
FIG. 23 is sequence chart 2 showing a communication sequence between a terminal and a mobile node according to the present invention.

FIGS. 22 and 23 show a procedure for the terminal 4 to transmit a packet to the mobile node 3.

To send a packet to the mobile node 3, the terminal 4 must acquire an IP address of the mobile node 3. In the example of this embodiment, the terminal 4 acquires the IP address of the mobile node 3 using a SIP message.

Assume that the SIP server 5c is set to the terminal 4 as a destination of the SIP message.

The terminal 4 sends a SIP message (invite) to the SIP server 5c (121). FIG. 24 shows an example of the SIP invite message 403 from the terminal 4 to the SIP server 5c. The SIP message (invite) sets destination information of the invite message to the start-line field. The SIP URI (userA@home.com) of the mobile node 3 is set to the start-line field of the SIP message (invite; 121).

Having received the SIP message (invite), the SIP server 5c determines the invite message destination according to destination information of the start-line field. If a domain name is set to the destination information, the SIP server 5c sends a DNS query to the DNS server 6c. In corporation with the gateway (DNS-ALG) 9a and the DNS server 6a, the DNS server 6c resolves the name of the SIP server 5a (122). For example, an address translation method described in JP-A-2001-274419 is used as the method of corporation of the address translation unit (TR) 1 and the gateway (DSN-ALG) 9. The gateway (DSN-ALG) 9 acquires from the address translation unit 1a a temporary IPv4 address corresponding to the IPv6 address corresponding to the domain name of the SIP server 5a and translates the DNS query response. The translation information table 500 of the translation information memory part 16 in the translation unit 1a stores the translated information (123, 124).

The SIP server 5c acquires the temporary IPv4 address of the SIP server 5a as destination information of the SIP message (invite; 124) and sends the message to the temporary IPv4 address (125).

The address translation unit 1a detects the SIP message (invite; 126) and sends the message to the SIP address translation unit (SIP-ALG) 2a (127). For example, a SIP message translation method described in Japanese Patent Application Ser. No. 2001-373520 is used as the method of corporation of the address translation unit (TR) 1 and the gateway (SIP-ALG) 2a.

From the received SIP message, the gateway (SIP-ALG) 2a extracts parameters for IP address translation (128). To the address translation unit 1a, the gateway 2a sends an address query request 600 including an IP address of translation parameters (129).

FIG. 14 shows a message format of the address query request 600.

The address translation unit 1a receives the address query request 600 and makes a search through the translation information table 500 of the translation entry creation processing part 12 using the IP address of translation parameters.

If the IP address is present in the table 500 of the processing part 12, the translation unit 1a sends an address query request 650 including the translated IP address to the gateway 2a (130).

If the IP address is absent from the table 500 of the processing part 12, the translation unit 1a assigns a routable IP address on the network 7a to the IP address of translation parameters to create a translation entry. The translation unit 1a then activates the translation entry registration processing part 11 to set the translation entry to the translation information table 500 of the translation information memory part 16. The translation unit 1a sends an address query request response 650 including the translated IP address to the gateway 2a (130).

Figure 15:
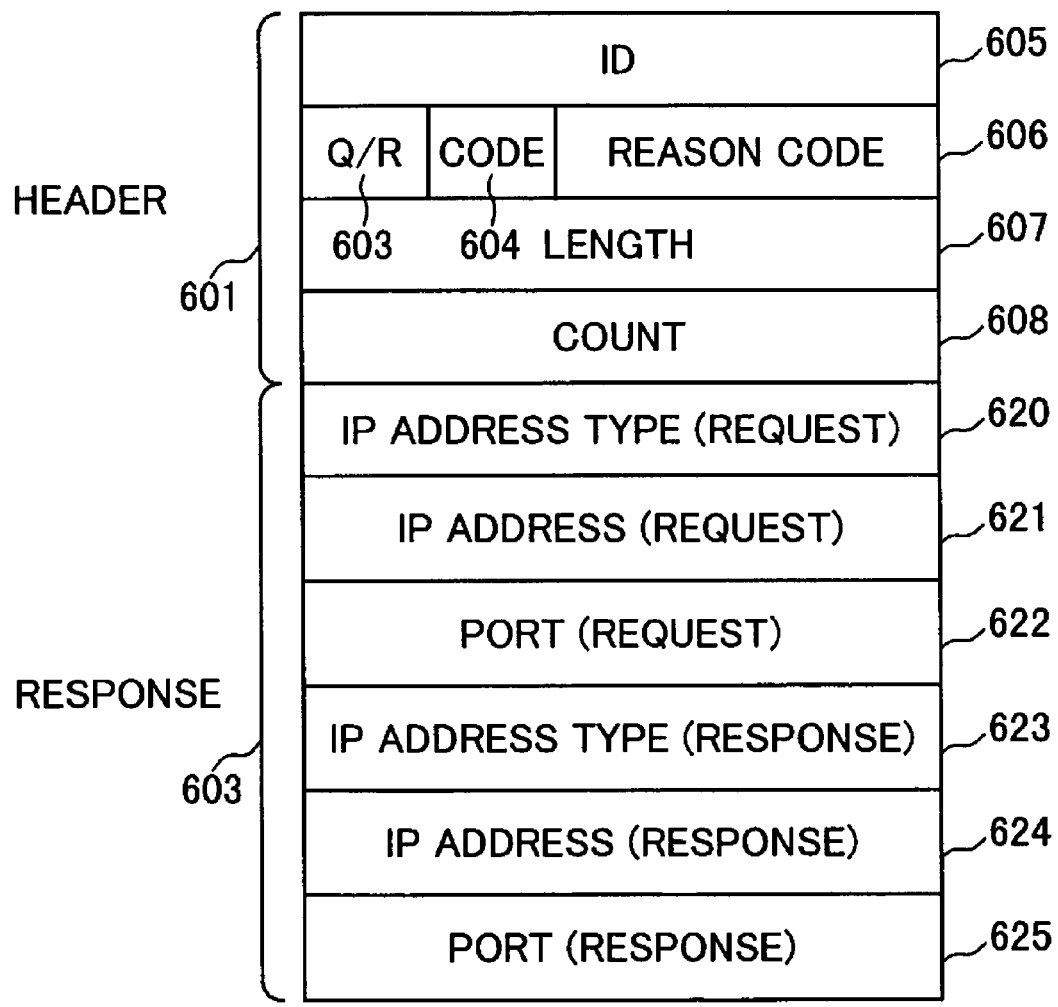
FIG. 15 is a diagram showing a format of an address query response message.

FIG. 15 shows a message format of the address query request response 650.

The gateway 2a receives the request response 650 and translates IP address information in the SIP message (131).

Having received the SIP message (invite) from the gateway 2a, the address translation unit 1a translates address information of the IP header of a packet including the SIP message (invite; 133). Referring to the translation information table 500 of the translation information memory part 16, the translation unit 1a translates a destination address into a real IPv6 address of the SIP server 5a and a source address into a temporary IPv6 address of the SIP server 5c.

The SIP server 5a receives the SIP message (invite; 134) and then makes a search through the information management table 510 of the location information memory part 37 using the SIP-URI (userA@home.com) of the mobile node 3 set to the start-line field of the message. The SIP server 5a obtains location information (userA%home.com@visit.com) of the mobile node 3 (135).

The SIP server 5a sends a SIP message (302 Moved Temporarily) including the location information (userA%home.com@visit.com) of the mobile node 3 to the SIP server 5c (136).

FIG. 25 shows a message example 50 of the SIP message (302 Moved Temporarily) from the server 5a to the server 5c. The location information (userA%home.com@visit.com) of the mobile node 3 is set to the contact header.

Returning to FIG. 22, the communication sequence will be further described. In corporation with the gateway 2a, the address translation unit 1a translates the IP address of the SIP message (136; 137). After having translated the address information of the IP header in a packet including the SIP message (138), the translation unit 1a sends the SIP message to the SIP server 5c (139).

Having received the SIP message (302 Moved Temporarily) as a response to the invite message, the SIP server 5c sends a response acknowledgement message (ACK) to the SIP server 5a (140). When the message (ACK) passes through the address translation unit 1a, the unit 1a translates the IP address of the SIP message in corporation with the gateway 2a (141). After having translated the address information of the IP header in a packet including the SIP message (142), the translation unit 1a sends the SIP message to the SIP server 5a (143).

According to the contact header (userA%home.com@visit.com) of the received SIP message (302 Moved Temporarily), the SIP server 5c determines the location information of the mobile node 3.

If a domain name has been set to the location information, the SIP server 5c sends a DNS query to the DNS server 6c. The DNS server 6c resolves the name of the SIP server 5b in corporation with a gateway (DNS-ALG) 9b and the DNS server 6b (151, 152). The gateway 9b acquires from the address translation unit 1b a temporary IPv4 address corresponding to an IPv6 address corresponding to the domain name of the SIP server 5b and translates the DNS query response. The translation information is stored in the translation information table 500 of the translation information memory part 16 of the translation unit 1b.

The SIP server 5c acquires as destination information of the SIP message (invite) a temporary IPv4 address of the SIP server 5b (153) and sends the SIP message (invite) to the temporary IPv4 address (154).

FIG. 26 shows a message example 405 of the SIP message (invite) from the server 5c to the server 5b. The location information (userA%home.com@visit.com) of the mobile node 3 is set to the start-line field as destination information of the message.

Returning to FIG. 23, the communication sequence will be described. When the SIP message (invite; 154) passes through the address translation unit 1b, the unit 1b translates the IP address contained in the SIP message in corporation with the gateway 2b (155). Having translated address information of the IP header of a packet containing the SIP message (156), the translation unit 1b sends the SIP message to the SIP server 5b (157).

The SIP server 5b makes a search through the SIP information management table 520 of the location information memory part 37 using the value (userA%home.com@visit.com) set to the star-line field of the SIP message. The SIP server 5b acquires location information (userA@mn6) of the mobile node 3 and sends the SIP message (invite) to the mobile node 3 (158).

If the SIP message (invite) is acceptable, the mobile node 3 sends a SIP message (200 OK) as a response.

According to via-header information set to the SIP message (invite), the SIP message (200 OK) is sent to the terminal 4 via the SIP server having processed the SIP message (invite; 159, 160, 163, 164).

The SIP message (200 OK) is a normal response to the SIP message (invite).

FIG. 27 shows a message example 406 of the SIP message (200 OK) from the mobile node 3 to the SIP server 5b. A value used as destination information by the terminal 4 to send data to the mobile node 3 is set to a c field of the message body. In the embodiment, a home address (mn6) dynamically acquired on the network 7b by the mobile node 3 is set to the c field.

Returning to FIG. 23, the communication sequence will be further described. When the SIP message (200 OK; 160) passes through the address translation unit 1b, the unit 1b translates the IP address contained in the SIP message in corporation with the gateway 2b (161).

Specifically, the gateway 2b extracts as an IP address of translation parameters the home address (mn6) of the mobile node 3 set to the c field of the SIP message (200 OK) and transmits an address query request to the address translation unit 1b.

The translation unit 1b makes a search through the translation information table 500 of the translation entry creation processing part 12 using the IP address of translation parameters.

If the IP address is absent from the table 500 of the processing part 12, the address translation unit 1b assigns a temporary IPv4 address (vmn4) to the home address (mn6) of the mobile node 3. The unit 1b activates the translation entry registration processing part 11 to register a correspondence between the home address (mn6) of the mobile node 3 and the temporary IPv4 address (vmn4) to the translation information table 500 of the translation entry creation processing part 12.

The gateway 2b translates the temporary IPv4 address (vmn4) for the home address of the mobile node 3 in the c field of the SIP message.

The address translation unit 1b translates address information of the IP header in a packet containing the SIP message (162) and sends the SIP message to the SIP server 5b.

The terminal 4 receives the SIP message (200 OK) and acquires the address (vmn4) of the mobile node 3 from the c field.

Having received the SIP message (200 OK), the terminal 4 sends a response confirmation message (ACK) to the mobile node 3 (165, 166).

When the SIP message (ACK; 166) passes through the address translation unit 1b, the unit 1b translates the IP address contained in the SIP message in corporation with the gateway 2b (167). After having translated the address information of the IP header in a packet including the SIP message (168), the translation unit 1b sends the SIP message to the SIP server 5b (169). The server 5b sends the SIP message (ACK) to the mobile node 3 (170).

As a result, the procedure sets a logical connection between the terminal 4 and the mobile node 3, that is, the terminal 4 and the mobile node 3 can communicate with each other.

To the mobile node 3, the terminal 4 sends a packet including the temporary IPv4 address (vmn4) as a destination address (DA) and the IPv4 address (a4) of the terminal 4 as the source address (SA) of the data packet (171).

According to the translation entry created in step 161, the address translation unit 1b changes the destination address from the temporary IPv4 address (vmn4) to the IPv6 address (mn6). The translation unit 1b assigns the temporary IPv6 address (va6) to the IPv4 address (a4) of the terminal 4 and updates the source address to the temporary IPv6 address (va6; 172).

The translation unit 1b sends the packet with the updated header information to the mobile node 3 (173).

To sends a packet to the terminal 4, the mobile node 3 uses an ordinary IPv6 packet transmitting procedure.

Figure 2:
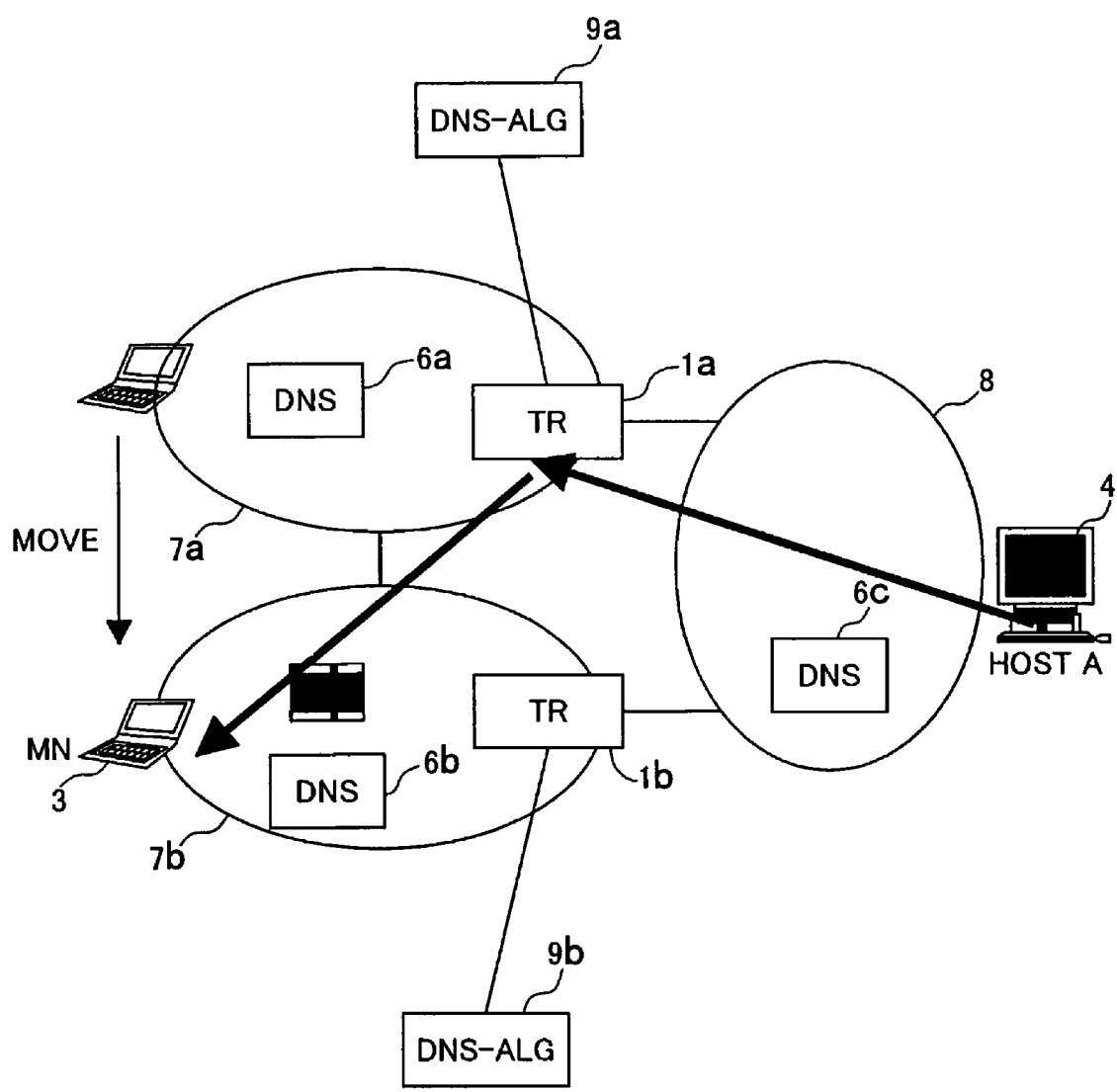
FIG. 2 is a diagram showing a packet route when a mobile node conforming to the mobile IPv6 has a fixed home address.
Figure 38:
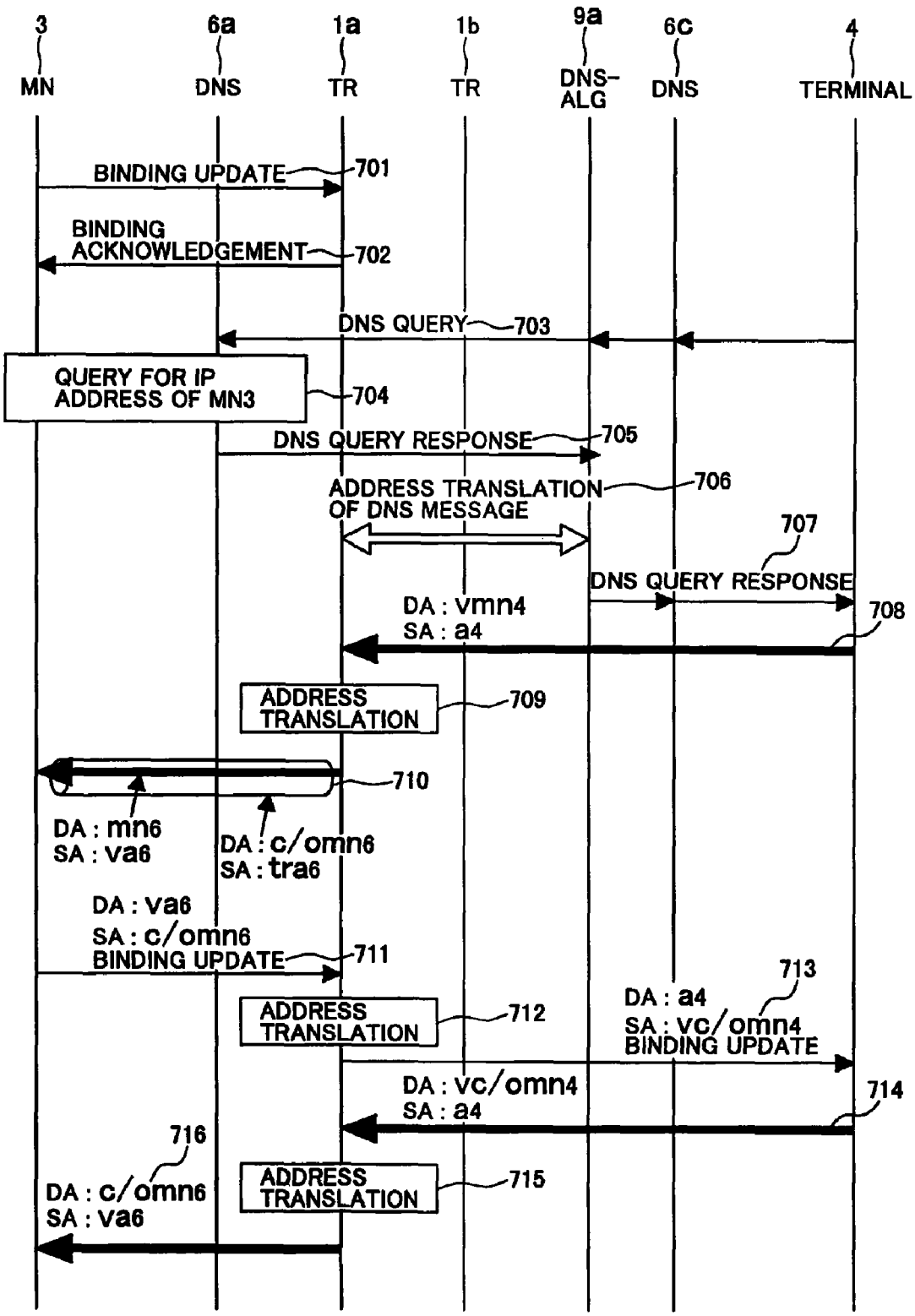
FIG. 38 is a sequence chart showing a communication sequence between a terminal and a mobile node in FIG. 2.

Referring to FIGS. 2 and 38, description will be given of a flow of a packet sent from the terminal 4 to the mobile node 3 when the mobile node has a fixed home address. Assume that the address translation unit 1a has the home agent (HA) function and the terminal identifies the mobile node 3 by a name.

FIG. 2 shows a route of a packet when the mobile node 3 has a fixed home address.

FIG. 38 shows a procedure for the terminal 4 to send a packet to the mobile node 3 in FIG. 2.

The mobile node 3 detects an event of movement from the network 7a to the network 7b and sends a control signal (Binding Update) to the address translation unit 1a having the home agent function (701). The control signal includes a home address (mn6) of the mobile node 3 and a care-of (C/O) address acquired on the network 7b.

Having received the control signal, the translation unit 1*a* stores information of the mobile node 3 in the binding cache and operates as a proxy of the mobile node 3. The translation unit 1*a* sends a response signal (Binding Acknowledgement; 702).

The terminal 4 resolves the name of the mobile node 3 using the DNS server 6 (703 to 707). In step 706, the translation unit 1*a* assigns a temporary IPv4 address (vmn4) to the home address (mn6) of the mobile node to create a translation entry.

The terminal 4 acquires vmn4 as the home address of the mobile node 3 and sends a packet to vnm4 (708). When the packet passes through the address translation unit 1*a*, the unit 1*a* translates address information of the IP header in the packet from IPv4 into IPv6 (709). After the address information is translated, the temporary IPv6 address (va6) corresponding to the IPv4 address (a4) of the terminal 4 is set to the source address in the IP header and the home address (mn6) of the mobile node 3 is set to the destination address.

The address translation unit 1*a* refers to the binding cache created in step 701 and acquires the care-of address (c/omn6) of the mobile node 3 from the home address (mn6) of the mobile node 3. The translation unit 1*a* encapsulates the translated IPv6 packet according to IPv6 and sends the packet to the mobile node 3 (710). The care-of address (c/omn6) of the mobile node 3 is set to the destination address of the encapsulation header and an address (tra6) of the translation unit 1*a* is set to the source address of the encapsulation header.

The mobile node 3 removes the encapsulation header from the received packet to obtain the original packet. The mobile node 3 makes a search through the binding update list thereof using the source address of the original packet. The temporary IPv6 address (va6) of the terminal 4 is beforehand set to the source address of the original packet.

If the pertinent entry is absent from the binding update list of the mobile node 3, the mobile node 3 sends a control signal (Binding Update) to the temporary IPv6 address (va6) of the terminal 4 (711). The control signal passes through the address translation unit 1*a*. The unit 1*a* stores the binding cache in place of the terminal 4. Or, the unit 1*a* translates the control signal into the IPv4 format to translate the header information (712) and sends the control signal to the terminal 4 (713).

If "Binding Update" is transmitted to the terminal 4, the terminal 4 sends the packet addressed to the mobile node 3 to the temporary IPv4 address (vc/omn4) corresponding to the care-of address of the mobile node 3 (714). The packet passes through the address translation unit 1*a*. The unit 1*a* translates the header (715) of the packet and sends the packet to the care-of address (c/omn6) of the mobile node 3 (716).

If the address translation unit 1*a* stores the binding cache in place of the terminal 4, the terminal 4 sends the packet to the mobile node 3 in a procedure similar to that of steps 708 to 710. In place of step 710, the translation unit 1*a* may send the packet to the care-of address of the mobile node 3. At this point, the packet includes a routing header. The home address of the mobile node 3 is set to the routing header.

As can be seen from the description above, the control signal sent from the mobile node 3 to the terminal 4 to optimize the route and the packet sent from the terminal 4 to the mobile node 3 after the route optimization pass the address translation unit 1*a*. Therefore, when the mobile node has a fixed home address, the route between the mobile node 3 and the terminal 4 cannot be optimized.

According to the first embodiment of the present invention, by using the address translation unit 1 having the mobile IP protocol processing function and the SIP server 5, a packet can be delivered to the mobile node 3 of the mobile IPv6, the node 3 not having a home address. Since the packet addressed to the mobile node 3 passes through the address translation unit 1 existing on a network on which the mobile node 3 has dynamically acquired a home address, the route of the packet to mobile node 3 can be optimized. By using SIP as the session control procedure between the mobile node 3 and the terminal 4, audio signals can be communicated between the mobile node 3 and the terminal 4.

Referring now to the drawings, description will be given of a second embodiment of the present invention.

The first and second embodiments differ from each other in the session control protocol type and the method of identifying the mobile node.

The second embodiment uses ITU-T H.323 as the session control protocol. The second embodiment identifies the mobile node by an alias address standardized in H.323.

Figure 28:
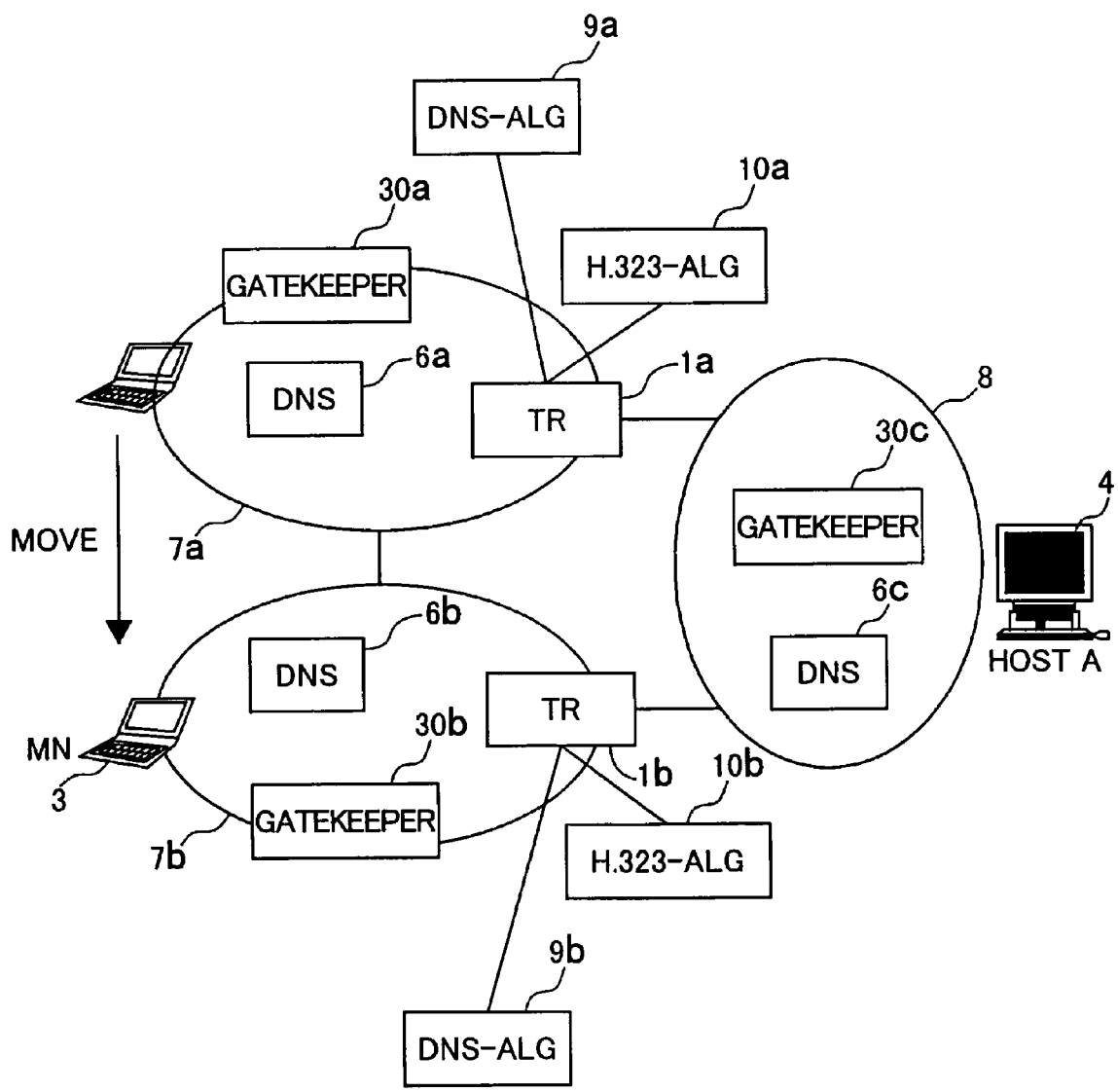
FIG. 28 is a diagram showing an example of a configuration of a communication network in a second embodiment according to the present invention.

FIG. 28 shows a configuration example of a communication network when a mobile node conforming to the mobile IPv6 communicates with an IPv4 terminal in the second embodiment.

In the second embodiment, an address translation unit 1 includes a unit to communicate with a H.323 address translation unit (H.323-ALG) 10 in place of the gateway (SIP-ALG) 2 and a unit to detect a H.323 message.

In the second embodiment, networks 7 and 8 each include a gatekeeper 30 in place of a SIP server.

The gateway (H.323-ALG) 10 includes (1) a unit to extract a translation parameter(s) address from the H.323 message, (2) a unit to send an address translation request to the address translation unit 1, (3) a unit to receive a response to the address translation request from the address translation unit 1, and (4) a unit to update the translation parameter(s) address of the H.323 message according to information received from the address translation unit 1.

Figure 29:
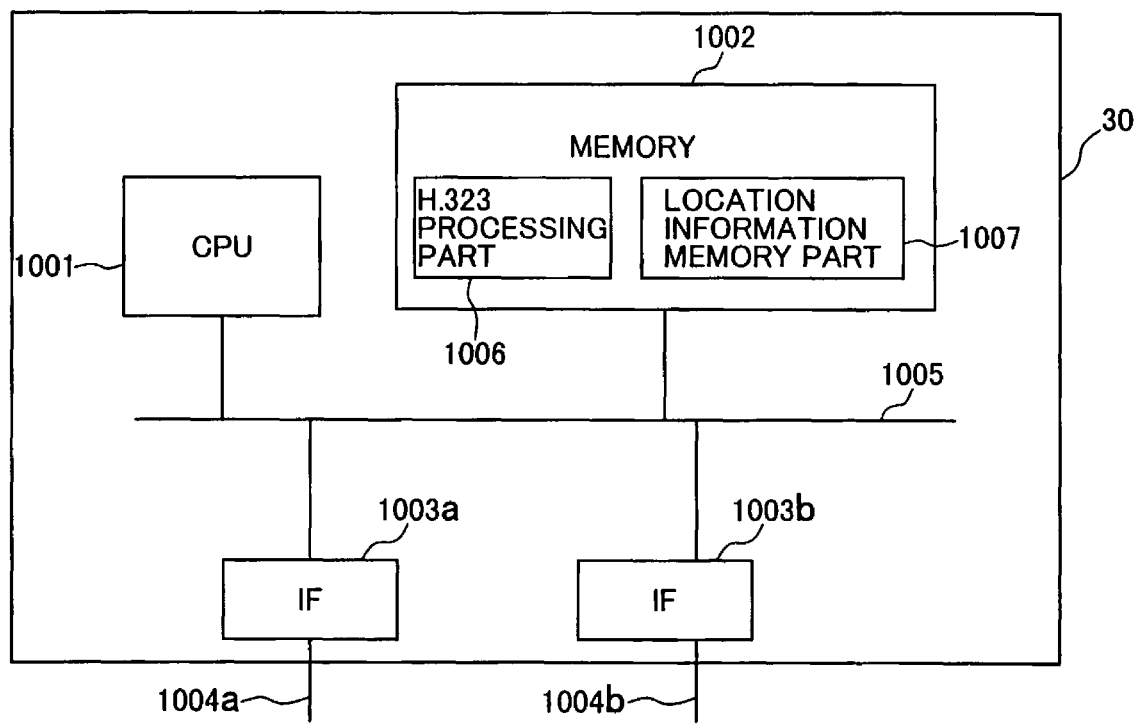
FIG. 29 is a block diagram showing a configuration of a gatekeeper in the second embodiment.

FIG. 29 shows a configuration example of the gatekeeper 30. The keeper 30 includes interface units (IF; 1003*a*, 1003*b*) to respectively accommodate communication lines (1004*a*, 1004*b*), a memory 2002, a CPU 1001, and a bus 1005 to connect the constituent components to each other.

The memory 1002 stores a H.323 processing part 1006 and a location information memory part 1007.

The H.323 processing part includes a H.323 protocol function and a gatekeeper function.

The location information memory part 1007 includes a table of a correspondence between H.323 alias addresses and H.323 transport addresses. In the second embodiment, the mobile node 3 is uniquely identified by a H.323. alias address.

Figure 30:
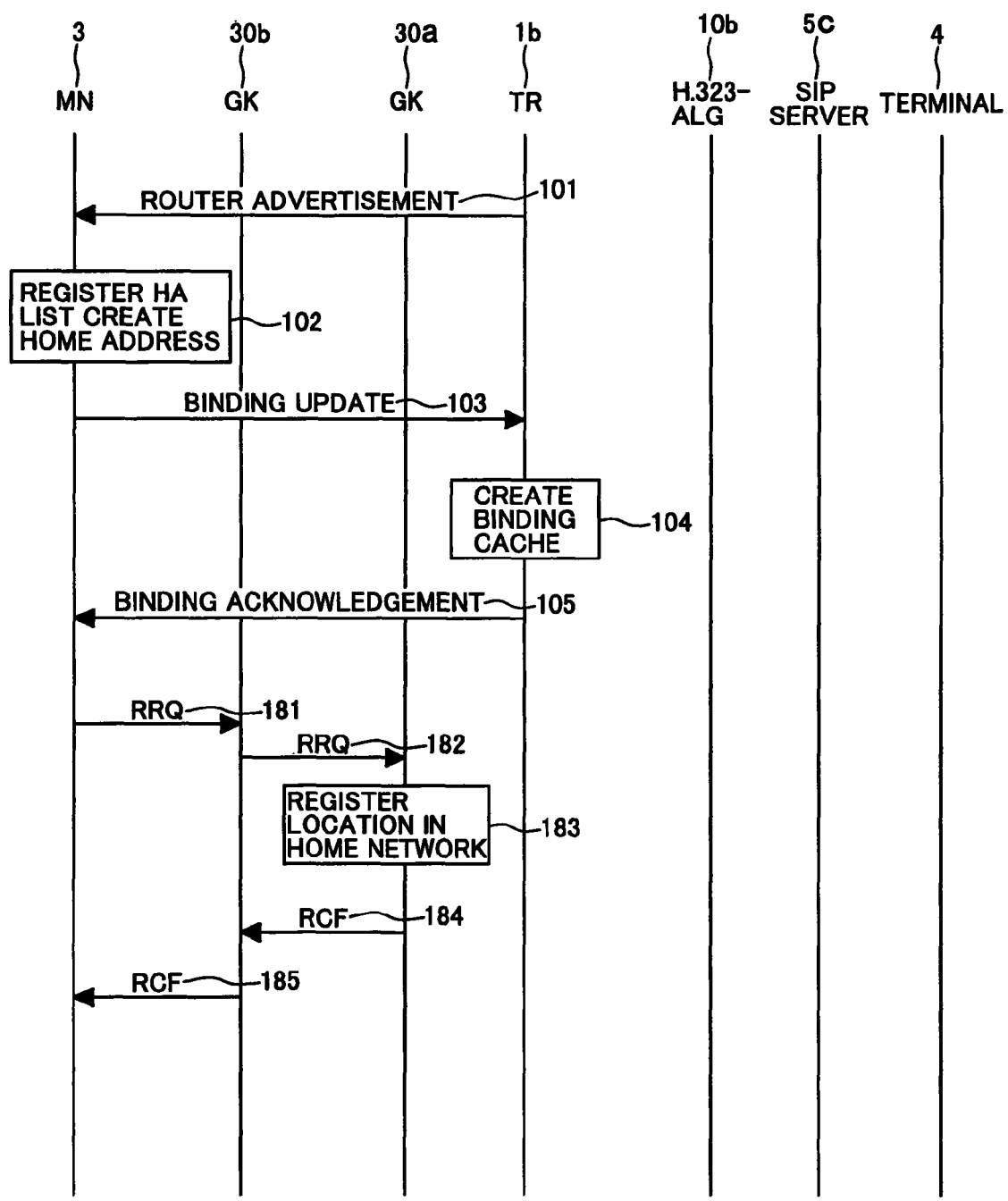
FIG. 30 is a sequence chart showing a location registration sequence in the second embodiment.

FIG. 30 shows a procedure for the mobile node 3 to register a location on a network 7*b* in the second embodiment.

The mobile node 3 dynamically acquires a home address on the network 7*b*. A procedure from step 101 to step 105 is almost the same as that of the first embodiment.

The location registration procedure varies between the second and first embodiments in the control signal used to register a location to the gatekeeper 30. In the second embodiment, the control signal to register the location is a control signal standardized in the ITU-T H.323 recommendations.

The mobile node 3 sends a control signal (Registration Request (RRQ)) to a gatekeeper (GK) 30*b* to register a location (181). Having received the control signal, the gatekeeper 30*b* extracts an H.323 alias address of the mobile node 3 from the control signal. The gatekeeper 30*b* determines a home network 7*a* of the mobile node 3 according to the H.323 alias address of the mobile node 3 and sends the control signal to a gatekeeper 30*a* (182). The gatekeeper 30*b* may also store the location information of the mobile node 3 in the location registration memory part 1007.

Having received the control signal for the location registration, the gatekeeper 30a adds an entry of the H.323 alias address of the mobile node 3 to the location registration memory part 1007 and stores information of a correspondence between the H.323 alias address and the H.323 transport address of the mobile node 3 (183). The gatekeeper 30a stores a home address dynamically assigned to the mobile node in a H.323 transport address field.

The gatekeeper 30a sends a response (Registration Confirmation (RCF)) to the control signal requesting the location registration via the gatekeeper 30b to the mobile node 3 (184, 185).

In the second embodiment, a procedure for a terminal 4 to send a packet to a terminal 3 is basically the same as that of the first embodiment excepting that the SIP message is replaced with the H.323 message.

According to the second embodiment of the present invention, by using an address translation unit having the mobile IP protocol processing function and a gatekeeper, a packet can be delivered to a mobile node 3 conforming to the mobile IPv6, the node 3 not having a home address. Since a packet addressed to the mobile node 3 passes an address translation unit existing on a network on which the mobile node 3 has dynamically acquired a home address, the route of the packet to the mobile node 3 can be optimized. By using H.323 as the session control procedure between the mobile node 3 and the terminal 4, audio signals can be communicated therebetween.

Description will now be given of a third embodiment of the present invention. In this embodiment, a telephone number is assigned to a mobile IPv6 terminal (mobile node (MN)) on the network shown in the first or second embodiment.

In the third embodiment, the networks 7 and 8 each adopt ENUM DNS. The ENUM DNS manages information of a correspondence between telephone numbers and uniform resource identifiers (SIP-URI, H.323 alias addresses, and the like).

To send a packet to the mobile node 3, the terminal 4 specifies the mobile node 3 by a telephone number. The terminal 4 issues a query to the ENUM DNS for a uniform resource identifier (URI) of the mobile node 3. After the URI of the mobile node 3 is acquired, the terminal 4 executes processing similar to the processing of the first or second embodiment.

According to the third embodiment of the present invention, if a terminal specifies its communication party by a telephone number and translates the telephone number into a uniform resource identifier, it is possible to deliver a packet to a mobile IPv6 terminal not having a home address.

Description will now be given of a fourth embodiment of the present invention by referring to the drawings.

The fourth embodiment has a feature of a packet encapsulation unit in the IP address translation unit 1.

Figure 31:
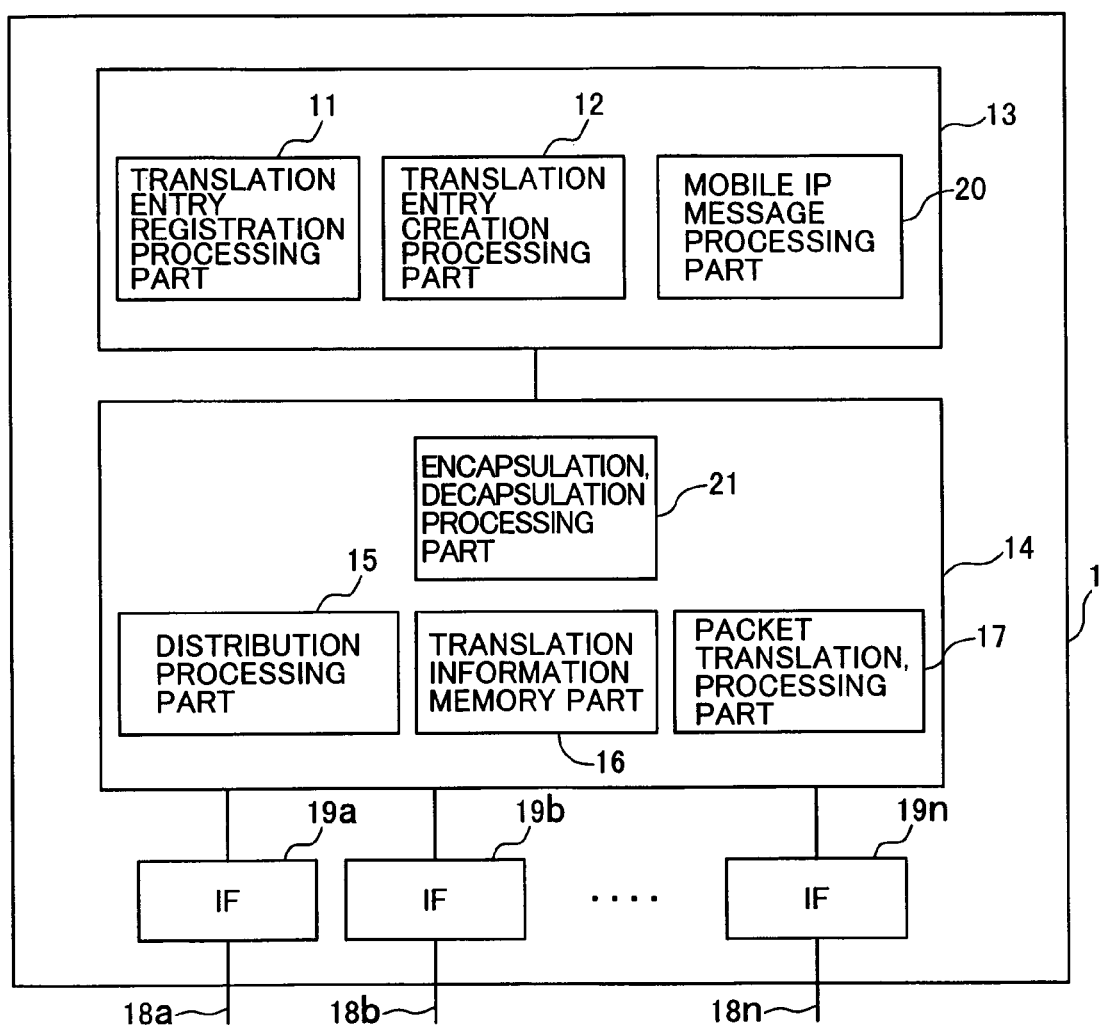
FIG. 31 is a block diagram showing a configuration of an address translation unit in a fourth embodiment according to the present invention.

FIG. 31 shows a configuration example of the address translation unit 1 of the fourth embodiment.

In the configuration, a packet transfer processing group 14 includes an encapsulation, decapsulation processing part 21 in addition to the constituent blocks or parts of the address translation unit 1 of the first embodiment.

The encapsulation, decapsulation processing part 21 of the translation unit 1 includes a function to receive an encapsulated packet from a terminal on the network 8 to remove an encapsulation header therefrom (decapsulation) and a function to add a header to a packet (encapsulation) to be sent to a terminal on the network 8.

The translation entry creation processing part 12 of the embodiment has an IPv4 private address as a temporary address to be assigned to an IPv6 address.

Figure 32:
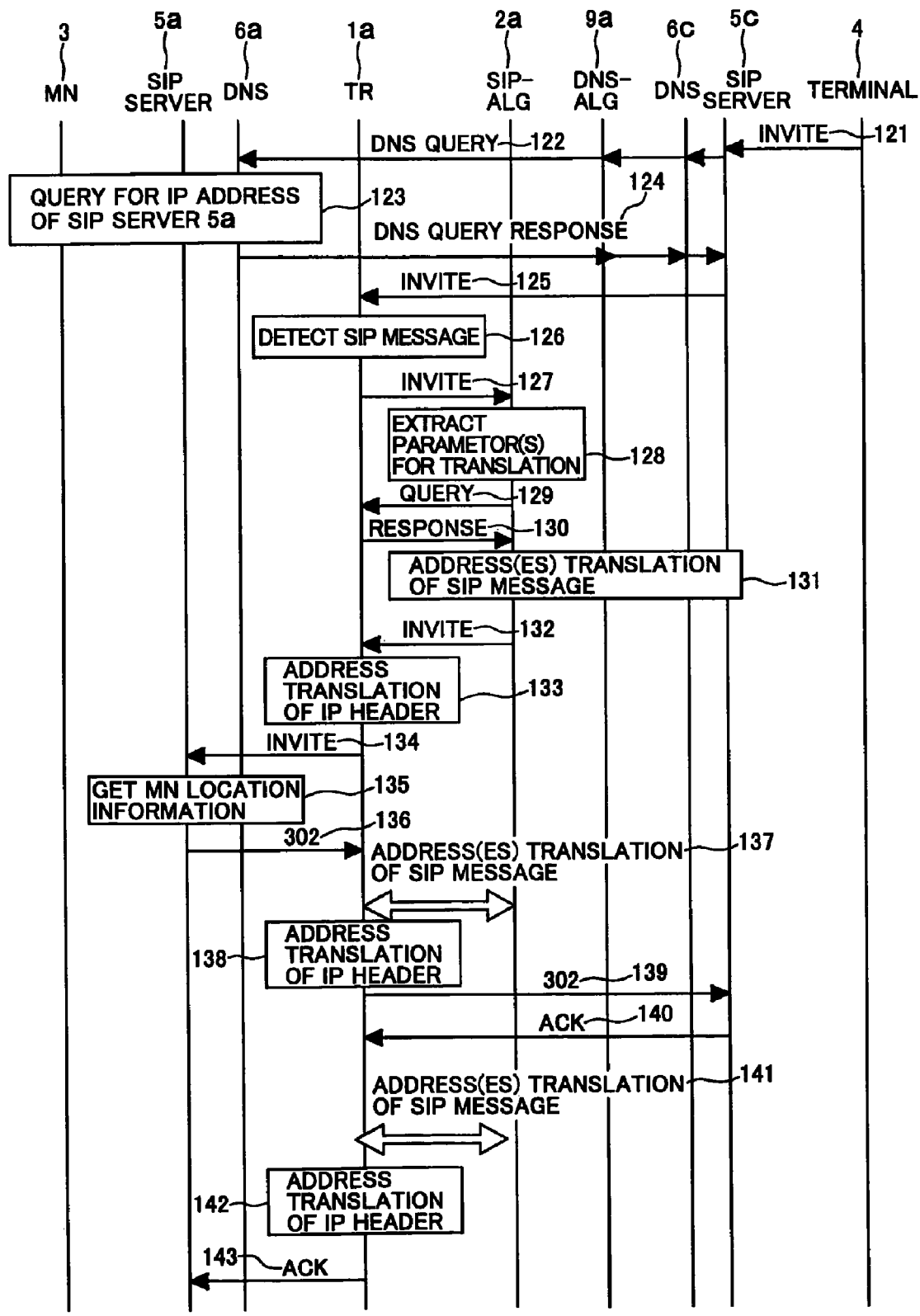
FIG. 32 is sequence chart 1 showing a communication sequence between a terminal and a mobile node in the fourth embodiment.
Figure 33:
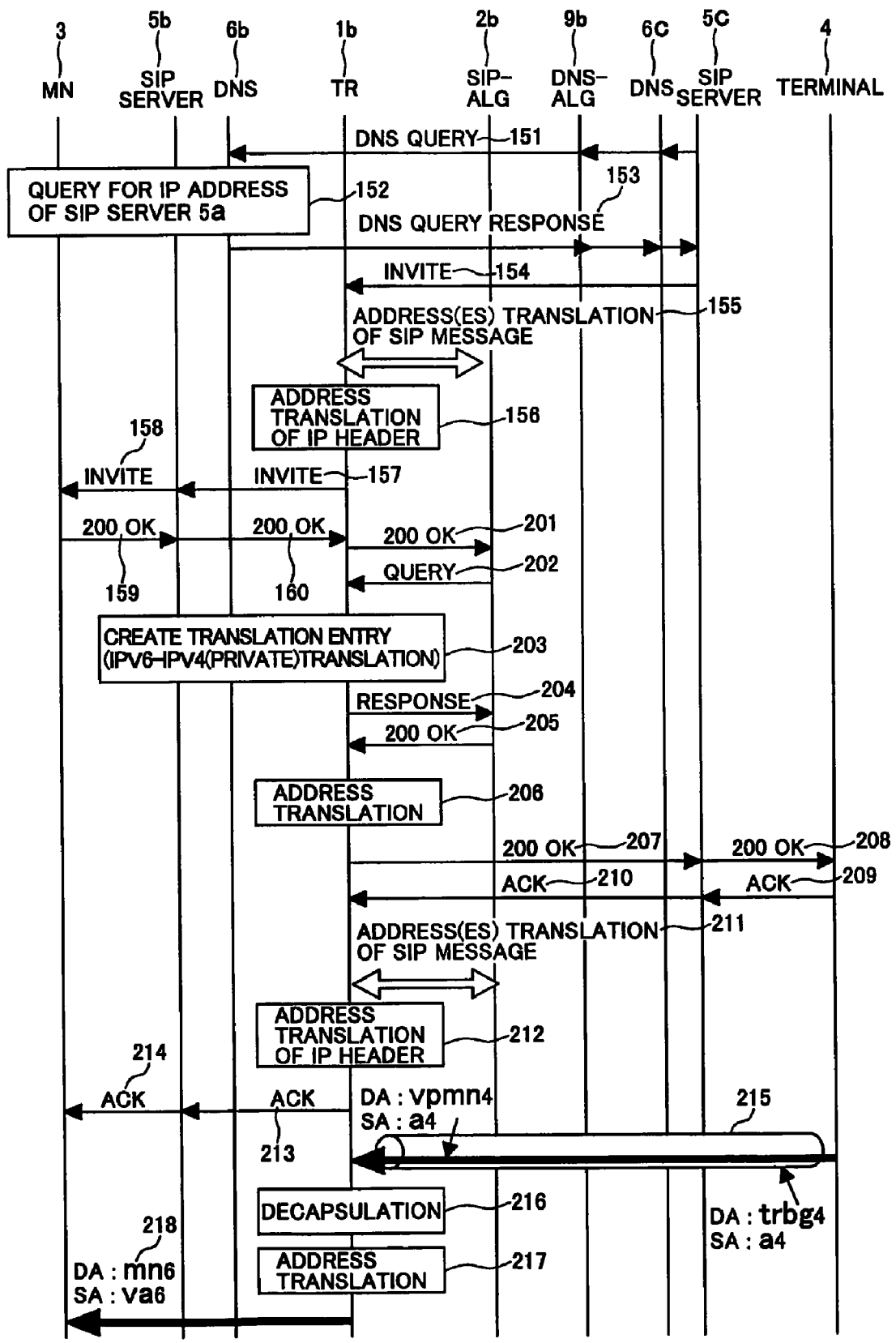
FIG. 33 is sequence chart 2 showing a communication sequence between a terminal and a mobile node in the fourth embodiment.

FIGS. 32 and 33 show a procedure for the terminal 4 on the network 8 to communicate with the mobile node 3 on the network 7b in the fourth embodiment.

Assume that the mobile node 3 dynamically acquires a home address on the network 7b and registers a location in a procedure of FIG. 20 for the first embodiment.

The communication procedure of the fourth embodiment is the same as that of the first embodiment up to step 160. Processing varies therebetween in the processing of step 161 and subsequent steps.

Referring now to FIG. 33, description will be given of the procedure beginning at step 160.

The address translation unit 1b detects a SIP message (200 OK) sent from the SIP server 5b to the SIP server 5c (160) and sends the message to the gateway (SIP-ALG) 2b (201).

The gateway 2b extracts as a translation parameter(s) IP address a home address (mn6) of the mobile node 3 set to the c field of the SIP message (200 OK). The gateway 2b sends an address query request including the translation parameter(s) IP address to the address translation unit 1b (202).

The translation unit 1b makes a search through the translation information table 500 of the translation entry creation processing part 12 using the translation parameter(s) IP address (mn6).

If the IP address is absent from the table 500 of the processing part 12, the translation unit 1b assigns a temporary IPv4 private address (vpmn4) to the home address (mn6) of the mobile node 3. The translation unit 1b activates the translation entry registration part 11 to set a translation entry, namely, a correspondence between the home address (mn6) and the temporary IPv4 private address (vpmn4) of the mobile node 3 to the table 500 of the processing part 12 (203).

The address translation unit 1b sends an address query request response 650 including the home address (mn6) and the temporary IPv4 private address (vpmn4; 204). A value indicating the IPv4 private address is set to an IP address type (response) field 623 of the response 650.

The gateway (SIP-ALG) 2b updates the IP address information in the SIP message. If the field 623 of the response 650 contains the IPv4 private address, the gateway 2b translates the translation parameter(s) IP address (mn6) into an IP address (vpmn4) after translation and an IPv4 global address (trbg4) assigned to the IPv4 interface of the translation unit 1b.

Having received a SIP message (200 OK) from the gateway 2b (205), the translation unit 1b translates address information of the IP header of a packet containing the SIP message (206). Referring to the translation information table 500 of the translation information memory part 16, the translation unit 1b translates the destination address into a real IPv4 address of the SIP server 5c and the source address into a temporary IPv4 address of the SIP server 5b.

FIG. 34 shows a message example 407 of the SIP message (200 OK) from the address translation unit 1b to the SIP server 5c. The temporary IPv4 address of the mobile node 3 and the IPv4 global address (trbg4) of the translation unit 1b are set to the contact header field and the c field.

Having received the SIP message (200 OK), the SIP server 5c (207) sends the message to the terminal 4 (208).

The terminal 4 receives the SIP message (200 OK) and acquires the address (vpmn4) of the mobile node 3 and the IPv4 global address (trbg4) of the translation unit 1b from the c field.

The terminal 4 sends a response confirmation message (ACK) via the SIP server 5c to the SIP server 5b (209, 210). When the SIP message (ACK) passes through the address translation unit 1b, the unit 1b translates the IP address in the SIP message in corporation with the gateway 2b (211). After having translated address information of the IP header in a packet containing the SIP message (212), the translation unit 1b sends the SIP message (ACK) to the SIP server 5b (213). The SIP server 5b then sends the SIP message (ACK) to the mobile node 3 (214).

Through the procedure, a logical connection is established between the terminal 4 and the mobile node 3, and hence the terminal 4 and the mobile node 3 can communicate with each other.

To sends a data packet to the mobile node 3, the terminal 4 sets the temporary IPv4 private address (vpmn4) corresponding to the home address of the mobile node 3 to the destination address in the IP packet header and the IPv4 address (a4) of the terminal 4 to the source address. The terminal 4 then encapsulates the original packet according to IPv4. T terminal 4 sets the IPv4 global address (trbg4) of the address translation unit 1b to the destination address of the encapsulation header and the IPv4 address (a4) of the terminal 4 to the source address (215) of the encapsulation header.

Having received the encapsulated packet, the translation unit 1b deletes the encapsulation header by the encapsulation, decapsulation processing part 21 to extract the original packet (216).

Referring to the translation information table 500 of the translation information memory part 16, the translation unit 1b translates the IP header of the original packet (217). The unit 1b changes the source IP address from the IPv4 address (a4) of the terminal 4 to the temporary IPv6 address (va6) and the temporary IPv4 private address (vpmn4) of the mobile node 3 to the IPv6 address (mn6).

The address translation unit 1b sends the packet containing translated header information to the mobile node 3 (218).

Description will now be given of a procedure of transmitting a packet from the mobile node 3 on the network 7b to the terminal 4 on the network 8 in the fourth embodiment.

Figure 35:
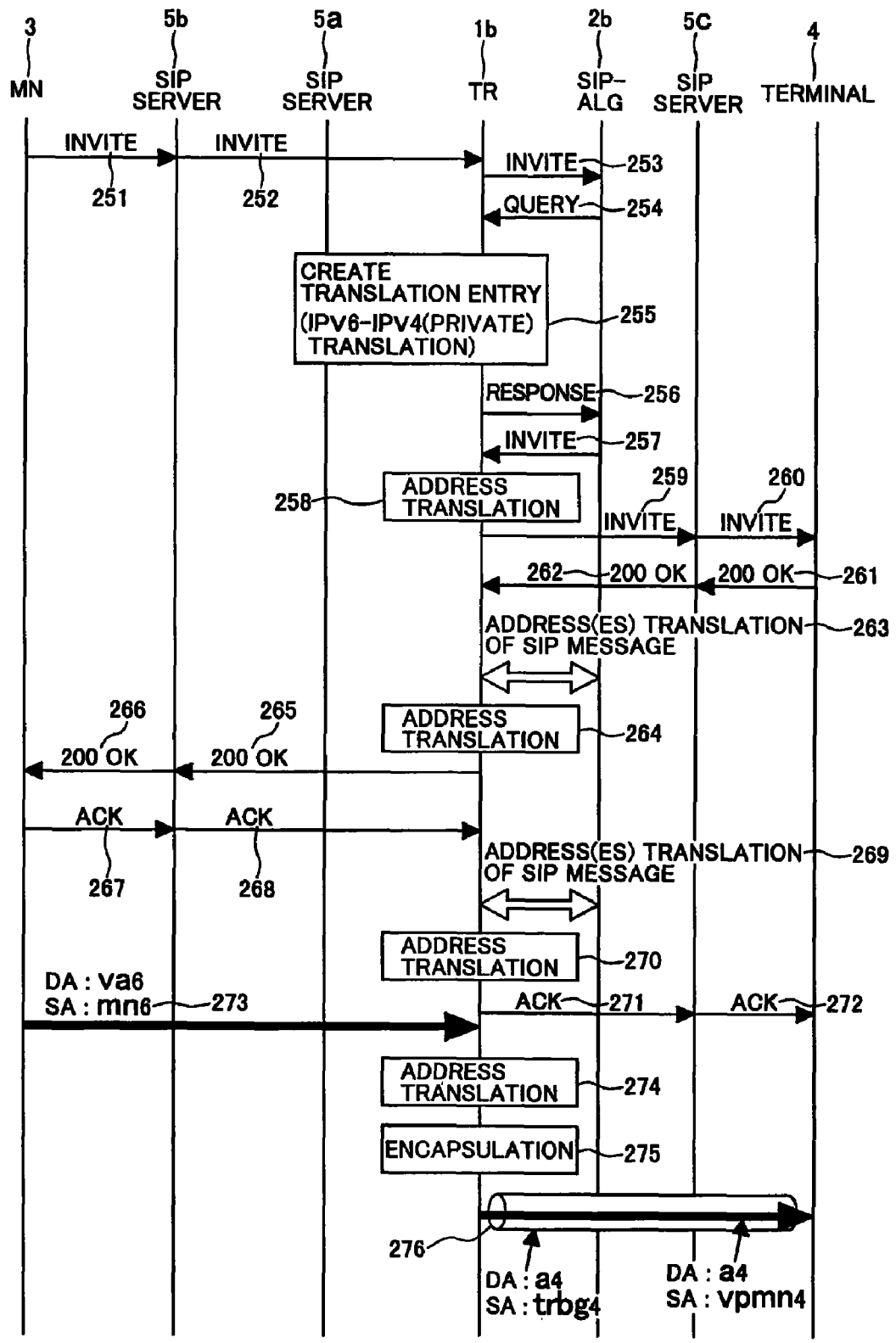
FIG. 35 is sequence chart 3 showing a communication sequence between a terminal and a mobile node in the fourth embodiment.

FIG. 35 shows a packet translation procedure when the mobile node 3 identifies the terminal 4 by a SIP uniform resource identifier (URI). Assume that a correspondence of location information between the terminal 4 and the SIP URI is beforehand registered to the SIP server 5c.

Assume that the mobile node dynamically 3 acquires a home address on the network 7b and registers a location according to the procedure shown in FIG. 20 for the first embodiment. The mobile node 3 thus acquired the home address on the network 7b recognizes that he address translation unit 1b is a home agent thereof and the mobile node 3 exists on the home link.

According to the mobile IPv6 specifications, a mobile node existing on the home link transfers a packet by the ordinary IPv6 routing. Therefore, the mobile node 3 can transfer a packet to the terminal 4 using the ordinary IPv6 routing.

To acquire an IP address using the SIP URI of the terminal 4, the mobile node 3 sends a SIP message (invite) to the SIP server 5b (251). The SIP URI of the terminal 4 is set as destination information of the invite message to the start-line field of the SIP message 251.

The SIP server 5b sends the SIP message (invite) to the SIP server 5c (252).

The address translation unit 1b detects the SIP message (invite) sent from the SIP server 5b to the SIP server 5c and transmits the message to the gateway (SIP-ALG) 2b (253).

The gateway 2b extracts the translation parameter(s) IP address from the SIP message (invite) and sends an address query request 600 including the translation parameter(s) IP address to the address translation unit 1b (254).

The unit 1b makes a search through the translation information table 500 of the translation entry creation processing part 12 using the translation parameter(s) IP address.

If the IP address is absent from the table 500 of the processing part 12, the translation unit 1b creates a translation entry. The unit 1b assigns an IPv4 private address as a temporary IPv4 address corresponding to the IPv6 address. The unit 1b sets the translation entry to the table 500 of the translation information memory part 16 (255).

The address translation unit 1b sends an address query request response 650 to the gateway 2b (256). A value indicating the IPv4 private address is set to the IP address type (response) field 623 of the response 650.

The gateway 2b translates IP address information in the SIP message. The gateway 2b translates the translation parameter(s) IP address into an IP address (IPv4 private address) after translation and an IPv4 global address assigned to the IPv4 interface of the translation unit 1b.

Having received the SIP message (invite) from the gateway 2b (257), the translation unit 1b translates address information of the IP header of a packet containing the SIP message (258). Referring to the table 500 of the translation information memory part 16, the translation unit 1b translates the destination address into the real IPv4 address of the SIP server 5c and the source address into the temporary IPv4 address of the SIP server 5b.

FIG. 36 shows a message example 408 of the SIP message (invite) from the address translation unit 1b to the SIP server 5c.

The temporary IPv4 address (vpmn4) and the IPv4 global address (trbg4) are set to a via header, a call-ID header, a contact header field, and a c field.

The SIP server 5c receives the SIP message (invite; 259), determines the location of the terminal 4, and sends the message to the terminal 4 (260).

If the SIP message (invite) is acceptable, the terminal 4 sends a SIP message (200 OK) as a response.

The terminal 4 acquires the address (vpmn4) of the mobile node 3 and the IPv4 global address (trbg4) of the address translation unit 1b from the c field of the message (invite) to use the information to send a packet to the mobile node 3. The address vpmn4 is a temporary IPv4 private address corresponding to the home address (mn6) dynamically assigned to the mobile node 3.

The SIP message (200 OK) is sent to the mobile node 3 via the server having processed the SIP message (invite; 261-266).

The mobile node 3 acquires the temporary IPv6 address (va6) of the terminal 4 from the parameters of the SIP message (200 OK).

Having received the SIP message (200 OK), the mobile node 3 sends a response confirmation message (ACK) to the terminal 4 (267-272).

The procedure resultantly sets a logical connection between the mobile node 3 and the terminal 4, that is, the mobile node 3 and the terminal 4 can communicate with each other.

To send a data packet to the terminal 4, the mobile node 3 sets the temporary IPv6 address (va6) to the destination address. To the source address, the mobile node 3 sets the home address (mn6) dynamically set to the mobile node 3 (273).

Having received the packet addressed to the temporary IPv6 address (va6) of the terminal 4, the address translation unit 1b refers to the translation entry to translate information of the header (274). The translation unit 1b sets the IPv4 address (a4) of the terminal 4 to the destination address and the temporary IPv4 private address (vpmn4) of the mobile node 3 to the source address.

Before transferring the data packet to the IPv4 network, the translation unit 1b of the fourth embodiment encapsulates the packet with the translated IP header according to IPv4 (275). The unit 1b sets the IPv4 address (a4) of the terminal 4 to the destination address of the encapsulation header and the IPv4 global address (trbg4) of the unit 1b to the source address of the encapsulation header (276).

Having received the encapsulated data packet, the terminal 4 decapsulates the packet to process the original packet.

Figure 37:
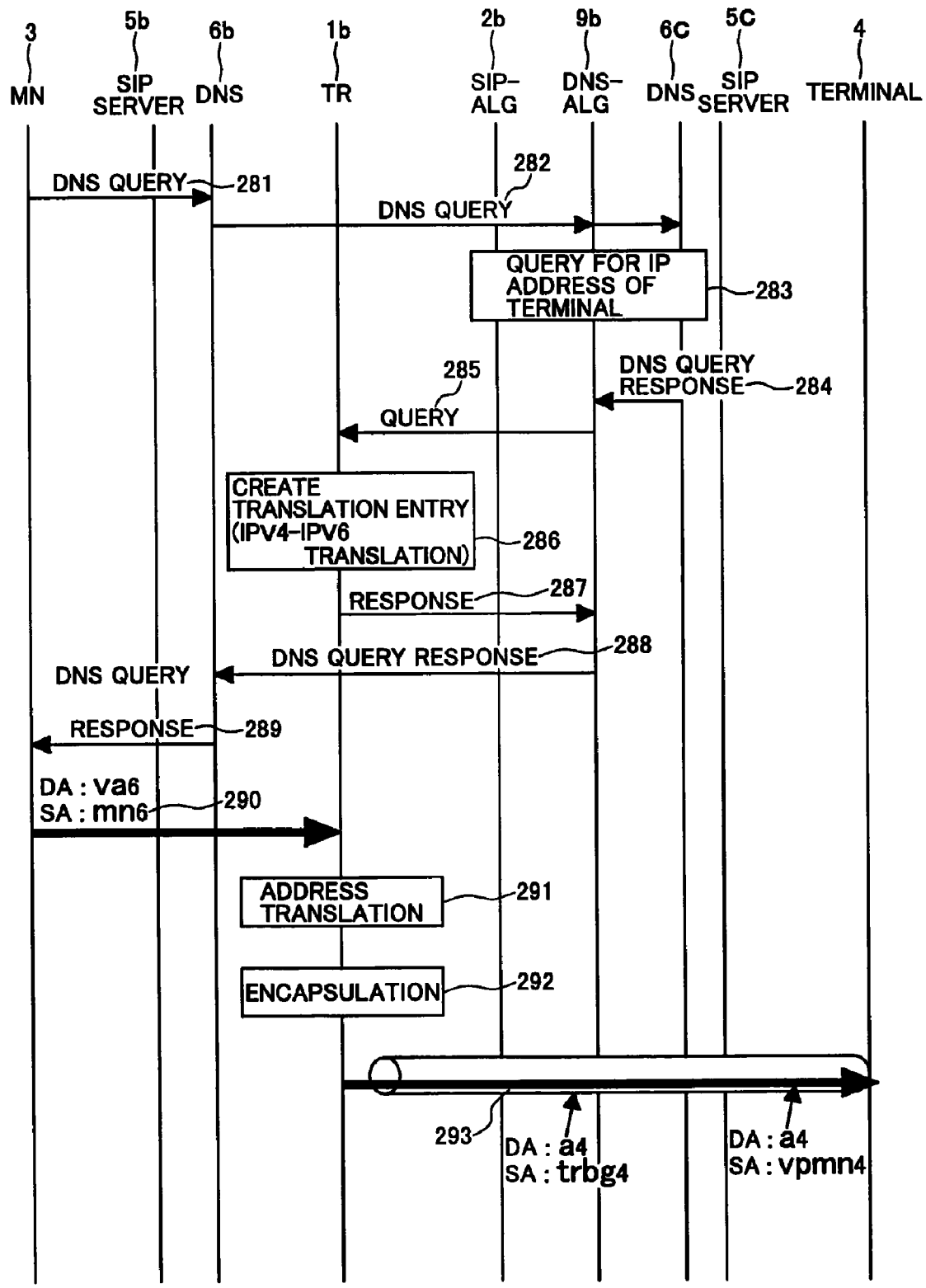
FIG. 37 is sequence chart 4 showing a communication sequence between a terminal and a mobile node in the fourth embodiment.

FIG. 37 shows a packet transmitting procedure when the mobile node 3 identifies the terminal 4 by a fully qualified domain name (FQDN).

The mobile node 3 sends a DNS query request including the FQDN of the terminal 4 to the DNS server 6b (281). The DNS server 6b resolves the name of the terminal 4 in corporation with the gateway (DNS-ALG) 9b and the DNS server 6c (282-284, 288).

Using translation information of the translation unit 1b, the gateway 9b translates the IPv4 address (a4) for the FQDN of the terminal 4 into the temporary IPv6 address (va6; 285-287). The translation information is stored in the translation information table 500 of the translation information memory part 16 of the translation unit 1b.

The mobile node 3 acquires the temporary IPv6 address (va6) as the IP address of the terminal 4 (289).

The mobile node 3 sends a packet to the terminal 4 (290). The mobile node 3 sets the temporary IPv6 address (va6) of the terminal 4 to the destination address of the packet to the terminal 4 and the home address (mn6) dynamically assigned to the mobile node 3 to the source address of the packet.

Having received the packet transmitted to the temporary IPv6 address (va6) of the terminal 4, the address translation unit 1b translates information of the header according to the translation entry (291). The unit 1b sets the IPv4 address (a4) of the terminal 4 to the destination address. The translation unit 1b assigns an IPv4 private address (vpmn4) as the temporary IPv4 address corresponding to the source address (mn6) and stores the address in the translation information table 500 of the translation information memory part 16.

Before transferring the data packet to the IPv4 network, the translation unit 1b of the fourth embodiment encapsulates the packet with the translated IP header according to IPv4 (292). The unit 1b sets the IPv4 address (a4) of the terminal 4 to the destination address of the encapsulation header and the IPv4 global address (trbg4) of the unit 1b to the source address of the encapsulation header (293).

Having received the encapsulated data packet, the terminal 4 decapsulates the packet to process the original packet.

In the fourth embodiment of the present invention, the address translation unit 1 includes (1) the IPv4 private address pool, (2) the unit to encapsulate by the IPv4 header the packet addressed to the IPv4 network, and (3) the unit to notify the address of the translation unit 1 to a node existing on the IPv4 network.

Therefore, the translation 1 can set an IPv4 private address as a temporary IPv4 address corresponding to an IPv6 node. Even the number of mobile nodes of the mobile IPv6 to communicate with the IPv4 terminal increases, the address translation unit can create a translation entry for the translation from an IPv6 address to an IPv4 address. This removes the problem of insufficient temporary IPv4 addresses of the address translation unit in the IPv6-IPv4 address translation.

Description will now be given of a fifth embodiment of the present invention. According to this embodiment, in the communication network shown in the first to fourth embodiments, when the address translation unit 1 receives a control signal or message (Binding Update) requesting registration of a location from the mobile IPv6 terminal (MN) 3 having a home address acquired in advance, the translation unit 1 creates a translation entry in the translation information table 500 of the translation unit 1.

The fifth embodiment differs from the first to fourth embodiments in an event for the mobile node 3 to create the translation entry.

As can be seen from the embodiments of the present invention, the address translation unit 1 includes a function to process the mobile IPv6 protocol and the mobile node (MN) 3 conforming to the mobile IPv6 includes a function to dynamically acquire a home address and a function to register a location to the SIP server. When a SIP identifier is assigned to the mobile node 3 and a correspondence between the SIP identifier of the mobile node 3 and the home address dynamically acquired is registered to the SIP server, a packet can be delivered to the mobile node 3 not having a home address.

The packet addressed to the mobile node 3 passes through the address translation unit 1 existing on the network on which the mobile node 3 has dynamically acquired the home address. In communication between a mobile node 3 and a terminal 4 existing in mutually different regions or domains, the route of the packet from the terminal 4 to the mobile node 3 can be optimized. By using the session control procedure between the mobile node 3 and the terminal 4, audio signals can also be communicated therebetween.

The address translation unit 1 includes an IPv4 private address pool, a unit to encapsulate by the IPv4 a packet addressed to an IPv4 network, a unit to decapsulate an encapsulated packet received from the IPv4 network, a unit to notify the address of the translation unit 1 to a node existing on the IPv4 network. The translation unit 1 assigns an IPv4 private address as a temporary IPv4 address corresponding to an IPv6 node. This enlarges the address pool of the temporary IPv4 addresses to be assigned to mobile nodes 3 by the translation unit 1. Therefore, the communication service can be provided even when the number of mobile nodes 3 to communicate with terminals in regions other than those of the mobile node 3 is increased.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An address translation method implemented in an address translator, the address translator connecting a first network conforming to a first protocol, a second network conforming to a second protocol, and a mobile terminal in the first network, the mobile terminal having a visited network address used in a visited network and a home network address used in a home network, the method comprising the steps of:
   storing information of a correspondence between a visited network address of the mobile terminal conforming to the first protocol and a home network of the mobile terminal conforming to the first protocol, and translation information between the home network address of the mobile terminal conforming to the first protocol and a home network address of the mobile terminal conforming to the second protocol, translating an address in a packet received from another terminal in the second network from the second protocol to the first protocol based on the translation information, determining the visited network address of the mobile terminal that uses the translated address as the home network address conforming to the first protocol; and transmitting the received packet with the visited network address as a destination address to the mobile terminal;

wherein the home network address of the mobile terminal conforming to the second protocol is assigned corresponding to the home network address of the mobile terminal conforming to the first protocol and a correspondence between the assigned home network address of the mobile terminal conforming to the first protocol and the home network address of the mobile terminal conforming to the, second protocol is registered as the translation information when the home network address of the mobile terminal included in a response to a request for connecting to the mobile terminal from another terminal passing through the address translator is an address conforming to the first protocol.

2. The address translation method according to claim 1 further comprising a step of making the translation information using the information of a correspondence between an identifier of the mobile terminal and the home network address of the mobile terminal conforming to the first protocol, the information of the correspondence is received from the mobile terminal.

3. The address translation method according to claim 1, wherein the first protocol is IPv6 and the second protocol is IPv4.

4. The address translation method according to claim 1, wherein the home network address is a home address of Mobile IP and the visited network address is a care-of address of Mobile IP.

* * * * *